(12) United States Patent
Ohshima et al.

(10) Patent No.: US 11,495,856 B2
(45) Date of Patent: Nov. 8, 2022

(54) GLASSES-TYPE DEVICE AND CHARGER FOR GLASSES-TYPE DEVICE

(71) Applicant: Ricoh Company, Ltd., Tokyo (JP)

(72) Inventors: Atsushi Ohshima, Osaka (JP); Tohru Yashiro, Kanagawa (JP); Sukchan Kim, Tokyo (JP); Yoshihisa Naijo, Kanagawa (JP); Kohji Takeuchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 634 days.

(21) Appl. No.: 16/525,912

(22) Filed: Jul. 30, 2019

(65) Prior Publication Data
US 2020/0052254 A1 Feb. 13, 2020

(30) Foreign Application Priority Data

Aug. 10, 2018 (JP) ............................. JP2018-150935
Jun. 25, 2019 (JP) ............................. JP2019-116890

(51) Int. Cl.
*G02C 5/00* (2006.01)
*G02C 5/22* (2006.01)
(Continued)

(52) U.S. Cl.
CPC ............ *H01M 50/20* (2021.01); *G06F 1/163* (2013.01); *H02J 7/00* (2013.01);
(Continued)

(58) Field of Classification Search
CPC .......... H01M 50/20; H02J 7/00; H04R 5/033; G06F 1/163; G02B 2027/0178; G02C 5/22; G02C 2200/08; G02C 11/10; Y02E 60/10
(Continued)

(56) References Cited

U.S. PATENT DOCUMENTS 1,736,953 A * 11/1929 Welsh ...................... G02C 5/00
351/114
2011/0310318 A1 12/2011 Kawagoe
(Continued)

FOREIGN PATENT DOCUMENTS

JP 2009-98655 A 5/2009
JP 2009-251068 A 10/2009
(Continued)

OTHER PUBLICATIONS

Extended European Search Report dated Dec. 18, 2019, in Patent Application No. 19188829.6, 9 pages.

*Primary Examiner* — Tuyen Tra
(74) *Attorney, Agent, or Firm* — Xsensus LLP

(57) ABSTRACT

A glasses-type device includes a lens support body that supports a pair of lenses, a first temple attached to the lens support body via one or more hinges, the first temple including a power supply unit provided at a position closer to the hinges than to a first ear hook, and a second temple attached to the lens support body via one or more hinges, the second temple including a control unit provided at a position closer to the hinges than to a second ear hook, the control unit having an operating unit operably by a user wearing the glasses-type device. A charger for charging the glasses-type device includes a power-transmitting coil that wirelessly transmits electric power to a power-receiving coil of the power supply unit, and a guide structure having a shape that is fitted into a shape of the temple, when the glasses-type device is engaged with the charger.

14 Claims, 18 Drawing Sheets

(51) Int. Cl.
   *H01M 50/20*    (2021.01)
   *G06F 1/16*     (2006.01)
   *H02J 7/00*     (2006.01)
   *G02B 27/01*    (2006.01)
   *H04R 5/033*    (2006.01)

(52) U.S. Cl.
   CPC ........ *G02B 2027/0178* (2013.01); *G02C 5/22* (2013.01); *G02C 2200/08* (2013.01); *H04R 5/033* (2013.01)

(58) Field of Classification Search
   USPC .............................. 351/41, 159.01, 159.39
   See application file for complete search history.

(56) References Cited

U.S. PATENT DOCUMENTS

| | | |
|---|---|---|
| 2013/0076998 A1 | 3/2013 | Kakinuma et al. |
| 2017/0176833 A1 | 6/2017 | Goto et al. |
| 2018/0299740 A1 | 10/2018 | Takeuchi et al. |

FOREIGN PATENT DOCUMENTS

| | | |
|---|---|---|
| JP | 2012-047888 | 3/2012 |
| JP | 2014-164449 | 9/2014 |
| JP | 2016-076475 | 5/2016 |
| JP | 2017-104239 | 6/2017 |
| JP | 2018-010084 | 1/2018 |
| WO | WO 2009/033136 A1 | 3/2009 |
| WO | WO2010/080999 A1 | 7/2010 |
| WO | WO2011/067578 A1 | 6/2011 |
| WO | WO 2012/068527 A2 | 5/2012 |
| WO | WO2013/188805 A2 | 12/2013 |

\* cited by examiner

# GLASSES-TYPE DEVICE AND CHARGER FOR GLASSES-TYPE DEVICE

CROSS-REFERENCE TO RELATED APPLICATIONS

This patent application is based on and claims priority pursuant to 35 U.S.C. § 119(a) to Japanese Patent Application No. 2018-150935, filed on Aug. 10, 2018, and 2019-116890, filed on Jun. 25, 2019, in the Japan Patent Office, the entire disclosure of which is hereby incorporated by reference herein.

BACKGROUND

Technical Field

The present invention relates to a glasses-type device and a charger for the glasses-type device.

Description of the Related Art

In recent years, research and development of wearable devices, such as glasses-type devices are actively conducted.

In some glasses-type devices, a state of an electroactive material (an electrochromic material, a liquid crystal material, or the like) is changed by application or removal of a voltage. For example, Japanese Unexamined Patent Application Publication No. 2018-10084A discloses photochromic glasses in which an electrochromic element is used as a lens and color optical density is changed according to a voltage applied to the electrochromic element, whereby light intensity is adjusted.

Moreover, PCT International Application Publication No. WO2010/080999A1 discloses electroactive glasses having lenses in which a refractive index of an electroactive material (for example, a liquid crystal material) is changed by application or removal of voltage such that the refractive power of the lenses can be changed or adjusted.

SUMMARY

Example embodiments of the present invention include a glasses-type device including a lens support body that supports a pair of lenses, a first temple attached to the lens support body via one or more hinges, the first temple including a power supply unit provided at a position closer to the hinges than to a first ear hook, and a second temple attached to the lens support body via one or more hinges, the second temple including a control unit provided at a position closer to the hinges than to a second ear hook, the control unit having an operating unit operably by a user wearing the glasses-type device.

Example embodiments of the present invention include a charger for charging the glasses-type device includes a power-transmitting coil that wirelessly transmits electric power to a power-receiving coil of the power supply unit, and a guide structure having a shape that is fitted into a shape of the temple, when the glasses-type device is engaged with the charger.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
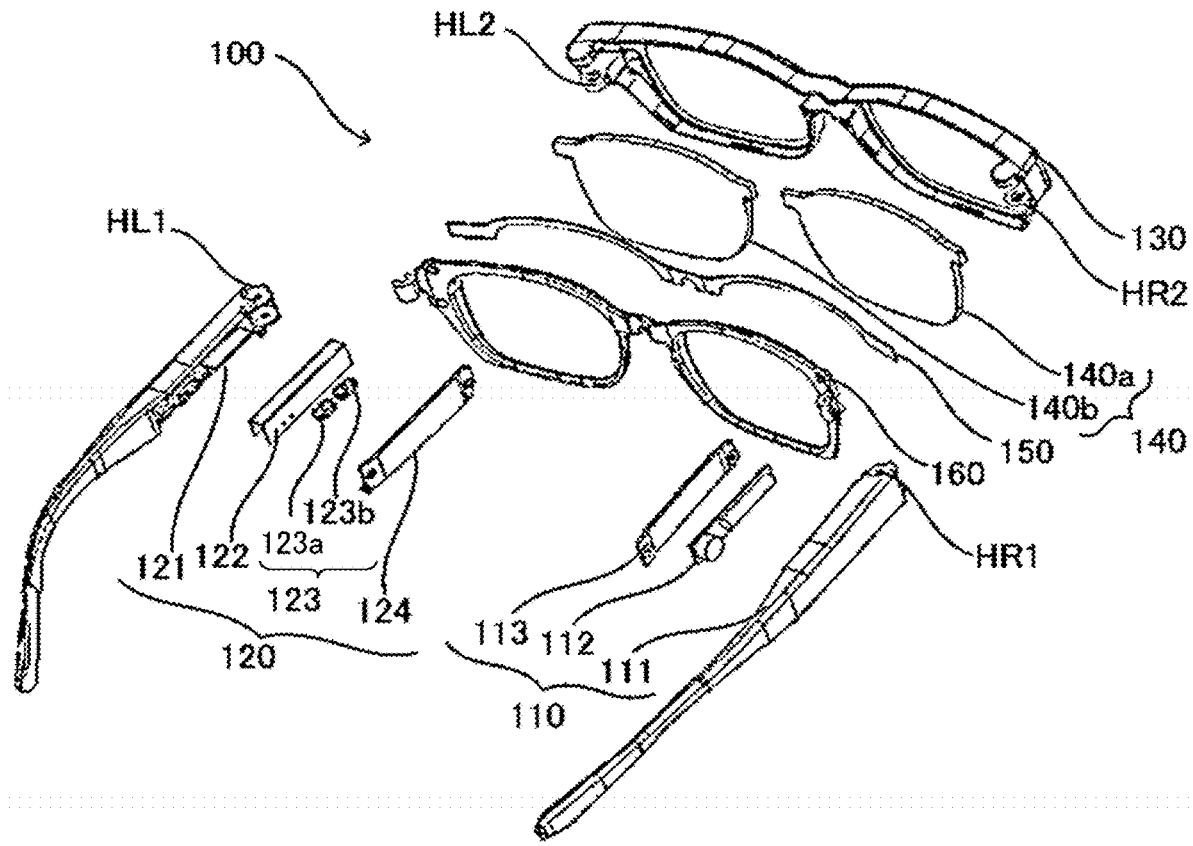
FIG. 1 is an exploded view of an example of a glasses-type device.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A wearable device such as a glasses-type device requires a power supply.

As such a power supply, a primary battery such as a dry cell, an alkaline battery, or a button battery can be used. In the case of the wearable device such as the glasses-type device, it is also useful to adopt a secondary battery, which can repeatedly be charged without being replaced for a long time, as the power supply.

In the following one or more embodiments, the power supply of the wearable device such as the glasses-type device may be the primary battery, such as the dry cell, the alkaline battery, or the button battery, or may be the rechargeable secondary batter.

It is desired to charge the secondary battery in a simple and efficient mode using a wireless power supply based on electromagnetic induction in which a power-transmitting coil and a power-receiving coil are used, instead of using a connector, into which a foreign object easily enters.

However, from a perspective of providing a practical glasses-type device that can be charged efficiently and effectively using a small inexpensive charger, the conventional glasses-type device is unsatisfactory.

Figure 14:
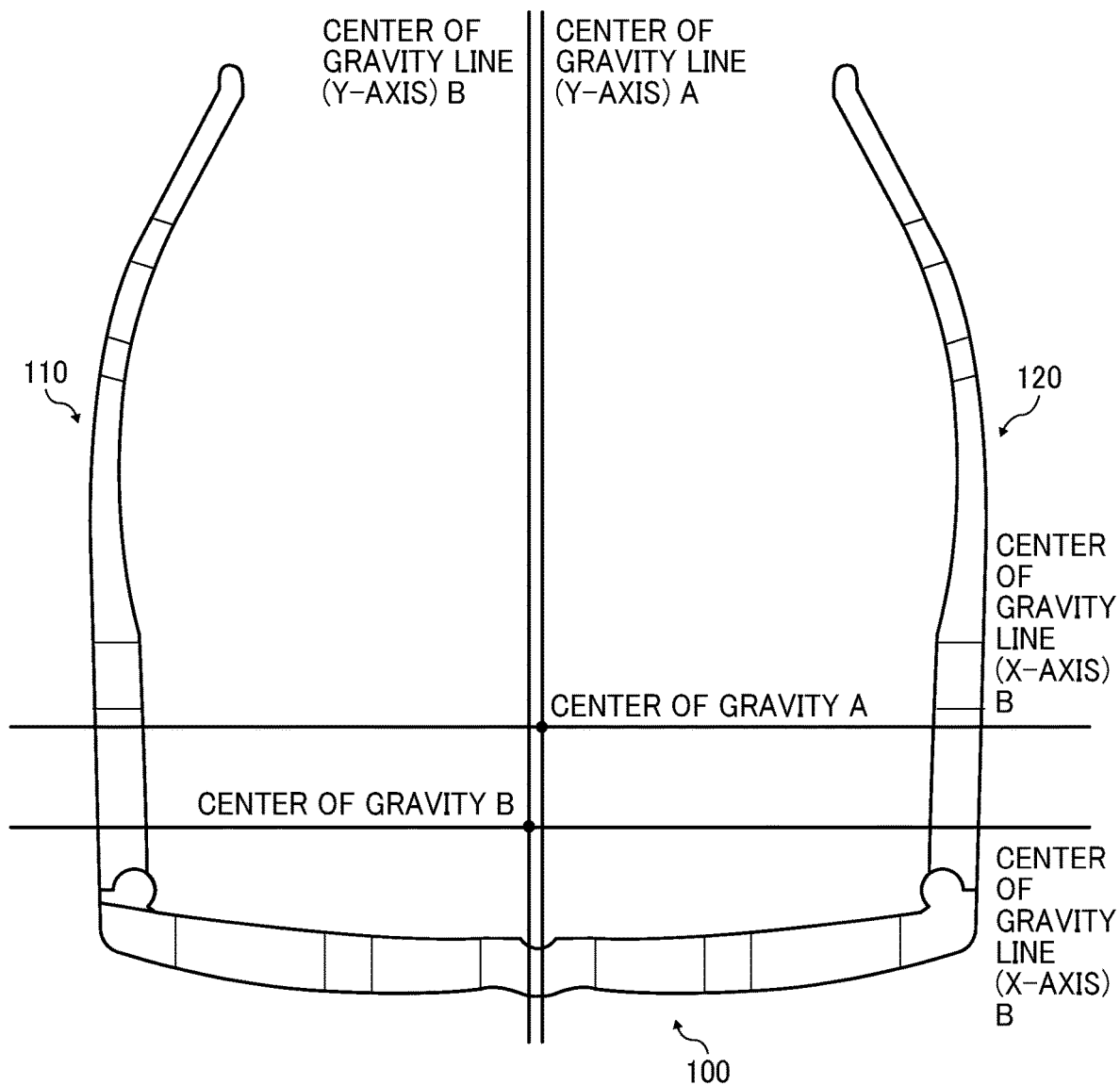
FIG. 14 is a view for explaining distribution of loads in the case when the center of gravity of the glasses-type device is A and B.
Figure 15:
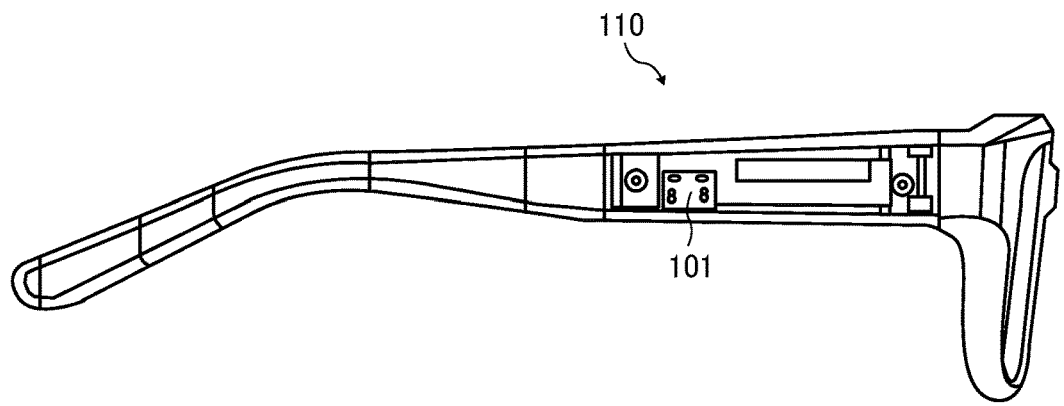
FIG. 15 is a view illustrating a glasses-type device having a USB connector, in alternative to a power supply coil, according to an example.
Figure 16:
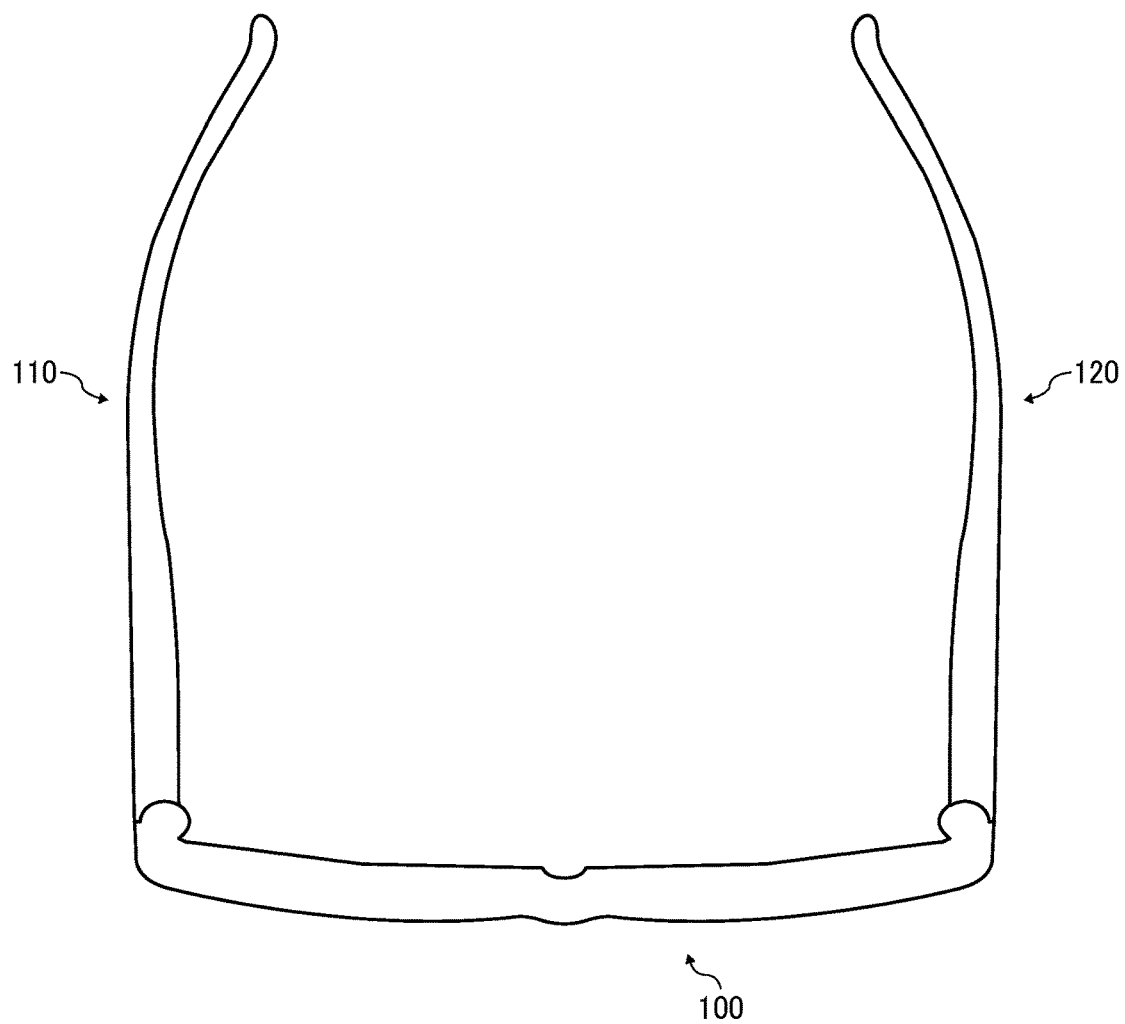
FIG. 16 is a view illustrating the glasses-type device when right and left temples are opened.

For example, FIG. 14 to FIG. 16 of WO2010/080999A1 each illustrate a charger for charging electroactive glasses. In such a charger, two charging areas (charging cradles) are provided correspondingly to two electronic units that are disposed on left and right temples. The charger is also provided with a movable arm that allows movement of the charging areas.

In order for the wireless power supply to function efficiently, a center of the power-transmitting coil and a center of the power-receiving coil have to be aligned, and a distance between the coils has to be reduced. Thus, the power-transmitting coil and the power-receiving coil have to be accurately aligned. In this respect, the charger described in WO2010/080999A1 is insufficient for the accurate alignment because size of the glasses possibly differs by size of a user's face. In addition, in the case where the power-receiving coil is provided on each of the two left and right temples, also two left and right power-transmitting coils have to be provided in the charger, which causes enlargement of a casing of the charger.

For these reasons, in regard to the conventional glasses-type device, there is a case where the size of the charger tends to be increased and the number of components of the charger is increased, whereby the cost of the charger is increased and accurately aligning the right and left pairs of the power-transmitting coils and the power-receiving coils is difficult.

In view of the above, in the glasses-type device according to one or more embodiments of the present invention, a power supply unit having a power-receiving coil is disposed in one of the two temples. Accordingly, the size of the charger can be reduced and the number of the components can be reduced. Therefore, the small inexpensive charger can be provided.

Further, in some embodiments, the charger is provided with an engaging portion that is engaged with the temple in a manner to follow a shape of the temple. In this way, the glasses-type device can be engaged with the charger according to the shape of the temple, in which the power-receiving coil is disposed, thus achieving the accurate alignment and efficient charging.

Furthermore, one of the temples is provided with a power supply unit that includes the primary battery, such as the dry cell, the alkaline dry cell, or the button cell, or the rechargeable secondary battery. The other temple is provided with a control unit having an operating unit, such as an operation button, and the like. In such a glasses-type device, adjustment of left-right weight balance improves usability of the glasses-type device.

In some embodiments, one of the temples is provided with the power supply unit that includes the power-receiving coil, the secondary battery, a battery protection circuit, and the like, and the other temple is provided with the control unit with the operation button, and the like. Also, in such a glasses-type device, the adjustment of the left-right weight balance improves the usability of the glasses-type device. In some embodiments, the power-receiving coil having relatively heavy weight is provided at a position in the one temple that is away from a hinge, and an operating unit having relatively heavy weight is provided at a position in the other temple that is near the hinge. That is, a position of the center of gravity of the power supply unit and a position of the center of gravity of the control unit are made asymmetric about a straight line that is orthogonal to a width direction (longitudinal direction) of a rim and passes through a center of the rim. In other words, a distance from an end on a lens support body side of the one temple to the position of the center of gravity of the one temple is different from a distance from an end on the lens support body side of the other temple to the position of the center of gravity of the other temple.

More specifically, the distance from the end on the lens support body side of the temple, which has the power supply unit, to the position of the center of gravity of the temple is set to be longer than the distance from the end on the lens support body side of the temple, which has the control unit, to the position of the center of gravity of the temple.

In addition, in the case where capacity of the secondary battery is increased, weight of the secondary battery is increased. As a result, such a layout is possibly obtained that the position of the center of gravity of the temple, which has the power supply unit, is close to the lens support body side. In this case, the distance from the end on the lens support body side of the temple, which has the power supply unit, to the position of the center of gravity of the temple becomes shorter than the distance from the end on the lens support body side of the temple, which has the control unit, to the position of the center of gravity of the temple.

As a result, the glasses-type device according to the one or more embodiments can eliminate a state where an excessive load of the glasses-type device is applied to one of a nose pad (pad arm) and an ear hook (end tip), and can provide the weight balance desired by the user. Therefore, by distributing the load, the usability and wearing comfort are improved, and the user can spend comfortably even when wearing the glasses-type device for a long time.

The one or more embodiments in which the weight balance of the left and right temples is made asymmetric have been described. However, some users desire symmetric weight balance of the left and right temples. In such a case, the weight of the secondary battery is adjusted, or the positions of the secondary battery and the power-receiving coil are adjusted to achieve the symmetric weight balance of the left and right temples.

More specifically, such a glasses-type device can be obtained, by setting the distance from the end on the lens support body side of the temple, which has the power supply unit, to the position of the center of gravity of the temple, equal to the distance from the end on the lens support body side of the temple, which has the control unit, to the position of the center of gravity of the temple. This can be achieved by adjusting the weight of the secondary battery, adjusting the positions of the secondary battery and the power-receiving coil, or providing the ballast.

Figure 13:
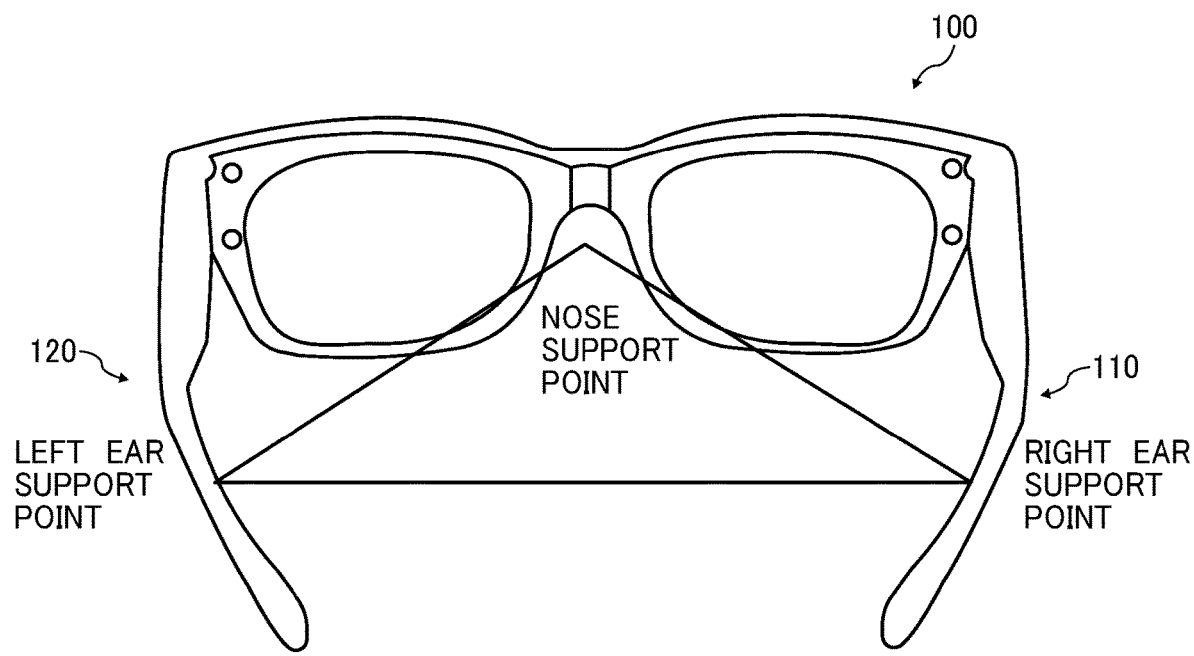
FIG. 13 is a view illustrating a nose support point, right ear support point, and left ear support point of the glasses-type device illustrated in FIG. 1.

As illustrated in FIG. 13, the glasses-type device 100 is usually supported on the face at three points. The weight of the glasses-type device 100 is distributed to a nose support point, a right ear support point, and a left ear support point. 13.

For example, as illustrated in FIG. 14, in the case where the position of the center of gravity is set at center of gravity A, and the weight is distributed by a ratio of the nose support point:the right ear support point:the left ear support point as 50:25:25, the large load is distributed to the nose.

In the case of center of gravity B in FIG. 14, for example, the weight distribution among the three support points can be changed. In order to set the center of gravity B, the weight of the power supply unit (the right temple) is made heavier than the controller, and the position of the center of gravity is moved to the nose side. In this way, the weight distribution can easily be changed.

Just as described, through setting the weight of the power supply unit and the weight of the control unit, which are disposed in the left and right temples, and the positions of the center of gravity of such units, the load distribution among the above three support points can be set as desired.

For example, when the center of gravity of the power supply unit and the center of gravity of the control unit are changed, the center of gravity is moved on an X-axis. Meanwhile, when the weight of the power supply unit and the weight of the control unit are changed, the center of gravity is moved on a Y-axis.

A description will hereinafter be made on embodiments of the present invention. However, the present invention is not limited to these embodiments in any respect.

In addition, number, positions, shapes, and the like of the following constituent members are not limited to those in the present embodiments and can be set to the number, the positions, the shapes, and the like that are appropriate for implementation of the present invention.

In the following one or more embodiments, a description will be made on glasses-type device in which a lens using an electrochromic element is used and which can be used like sunglasses by changing light transmittance of the lens.

Hereinafter, the lens using the electrochromic element may be referred to as an "electrochromic (EC) lens".

(Glasses-Type Device)

FIG. 1 is an exploded view of an example of the glasses-type device, according to an embodiment.

As illustrated in FIG. 1, a glasses-type device 100 includes a right temple 110, a left temple 120, a front rim 130, an EC lens 140, a flexible substrate 150, and a rear rim 160. Hereinafter, at least one of the front rim 130 and the rear rim 160 may simply be referred to as a "rim" or a "lens support body".

The right temple 110 and the left temple 120 are attached to respective ends of the front rim 130 via hinges H (HR1, HR2, HL1, and HL2).

The right temple 110 is provided with a power supply unit 112 that receives a wireless power supply. The left temple 120 is provided with a control unit 122 (FIG. 4A) for controlling light transmittance of a glasses lens (EC lens 140). The control unit 22 is provided with an operating unit 123 such as an operation button used to turn on/off a power supply switch and an adjusting operation button used to adjust light transmittance of the glasses. Here, the control unit 22 and the power supply unit 112 are disposed in the separate temples, at a position closer to the hinge than to the ear hooks. In this way, left-right weight balance of the glasses-type device 100 is easily adjusted. As a result, an excessive load of the glasses-type device 100 is unlikely to be applied to one of left and right nose pads and one of left and right ear hooks. This improves usability and wearing comfort. In the glasses-type device 100 of the present embodiment, a power-receiving coil 112c of the power supply unit 112 is disposed at a position away from the hinge, and the operating unit 123 of the control unit 122 is disposed near the hinge.

In this way, in the glasses-type device 100, a position of center of gravity of the power supply unit 112 and a position of center of gravity of the control unit 122 are made asymmetric about a straight line that is orthogonal to a width direction (longitudinal direction) of the rim and passes through a center of the rim. This eliminates a state where the excessive load of the glasses-type device 100 is applied to one of the nose pad (pad arm) and the ear hook (end tip). Therefore, by distributing the load, the wearing comfort is improved, and a user can spend comfortably even when wearing the glasses-type device 100 for a long time.

The power supply unit 112, the control unit 122, and the EC lens 140 are electrically connected to each other via the flexible substrate 150. The power supply unit 112 supplies power to the control unit 122.

Although a detail will be described later, the control unit 122 includes an operable power supply switch (power supply switch 123c in FIG. 4C) that can turn on/off connection with the power supply unit 112. The control unit 122 also includes the operating unit 123 such as the two adjusting operation buttons, each of which changes a voltage applied to the EC lens 140 and can adjust light transmittance of the EC lens 140. When the user presses the button as the operating unit 123, the control unit 122 changes the light transmittance of the EC lens 140.

Figure 12:
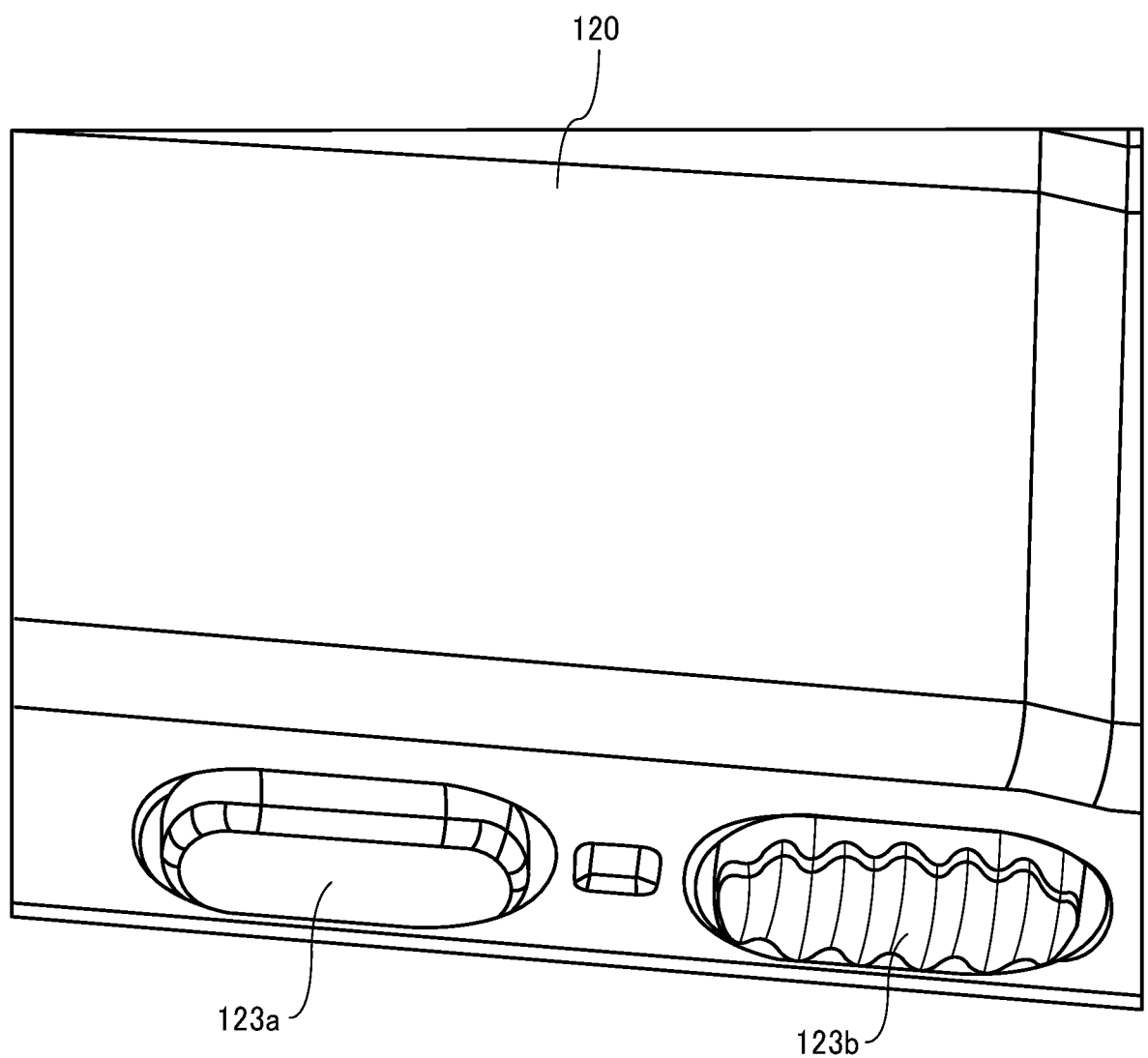
FIG. 12 is a view illustrating two buttons provided on the left temple of the glasses-type device illustrated in FIG. 1.

FIG. 12 is an illustration of an example of two adjusting operation buttons 123a and 123b provided on the left temple 120.

Here, the two adjusting operation buttons are illustrated. Alternatively, one operation button may be provided. In such case, the one operation button can be operated such that color is produced with one push, color density is gradually changed (density increase→upper limit density→density decrease→lower limit density) with long push, and the like.

Further, in the case where the two adjusting operation buttons are provided, the two adjusting operation buttons may have such shapes that the user can distinguish the buttons from each other with a fingertip. For example, in FIG. 12, the first button 123a is a flat button while the second button 123b is a wavy button. In this way, the operation buttons are easily recognized.

In the present embodiment, the buttons are used as the operating unit 123. However, the present invention is not limited thereto. For example, the operating unit 123 may be a slide switch, a noncontact switch, or the like.

Figure 10:
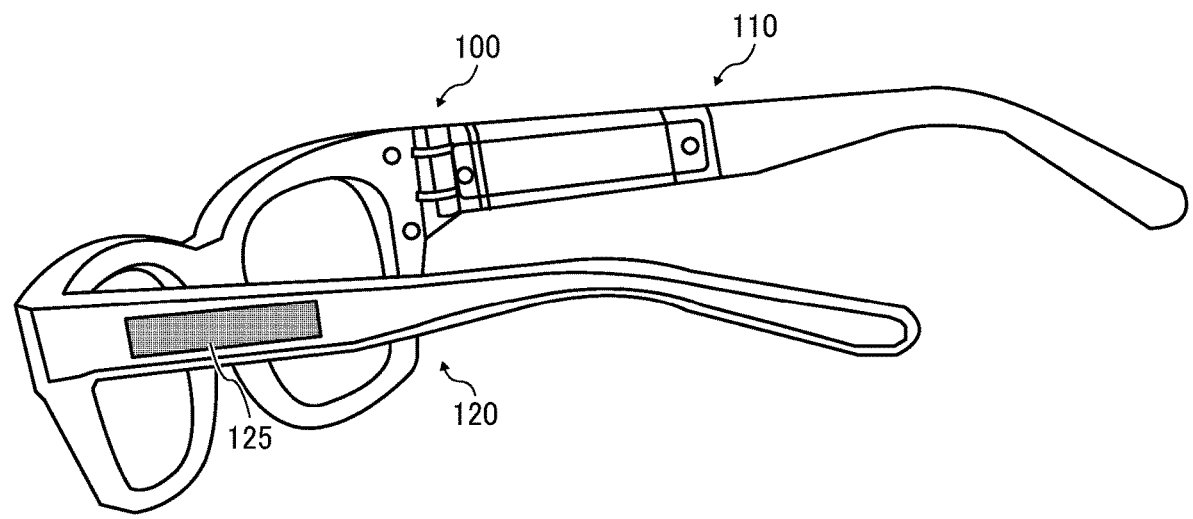
FIG. 10 is a view illustrating a glasses-type device with a touch sensor provided on an outer side of the temple, according to an example.

For example, the button can be replaced with a noncontact switch, such as a touch sensor. For example, as illustrated in FIG. 10, a touch sensor 125 of an electrostatic induction type, may be disposed on an outer side of the left temple 120. Although the touch sensor is disposed on the outer side of the left temple 120, the touch sensor 125 may be provided at a position in a frame where the touch sensor 125 is easily operated.

For a purpose of fitting the glasses-type device as glasses according to a shape of the user's face, the glasses-type device may be formed of a material with which a shape of the ear hook is easily changed. Accordingly, in the case where each of the units having hard electronic components is disposed at a position of the ear hook in the temple, it becomes difficult to change the shape of the ear hook, and thus the glasses-type device is not suitable as the glasses. In addition, when the switch, the button, or the like is arranged in the ear hook, it is difficult for the user to operate. For these reasons, in the glasses-type device 100 of the present embodiment, each of the units is embedded in a portion on the hinge side of one of the left and right temples.

Figure 11:
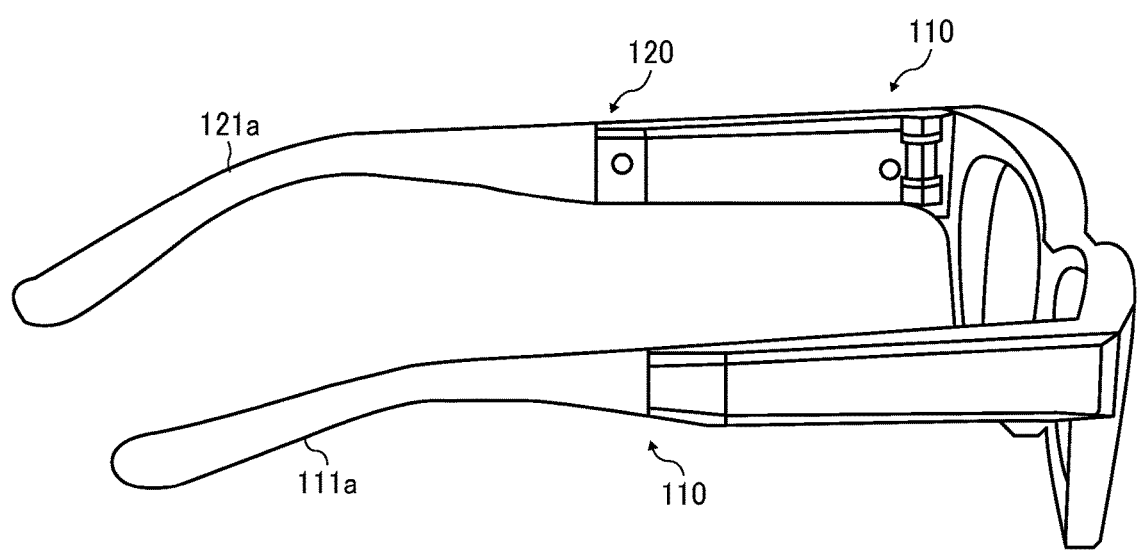
FIG. 11 is a view illustrating a glasses-type device having hear hooks that can be easily deformable, according to an example.

Here, for the purpose of fitting the glasses-type device as glasses according to the shape of the user's face, as illustrated in FIG. 11, the glasses-type device 100 may be formed of the material with which the shapes of each of the hear hook 111a and 121a are easily changed, such as rubber or gluey metal (soft steel or the like).

Accordingly, in the case where each of the units having the hard electronic components is disposed at a position of the ear hook 111a or 121a in the temple, it becomes difficult to change the shape of the ear hook 111a or 121a, which hinders adjustment suited for the user.

In addition, when the switch, the button, or the like is arranged in the ear hook 111a or 121a, it is difficult for the user to operate.

For these reasons, in the glasses-type device 100 of the present embodiment, each of the units is embedded in the portion on the hinge side of the ear hook on the left (or right) temple.

Figure 17:
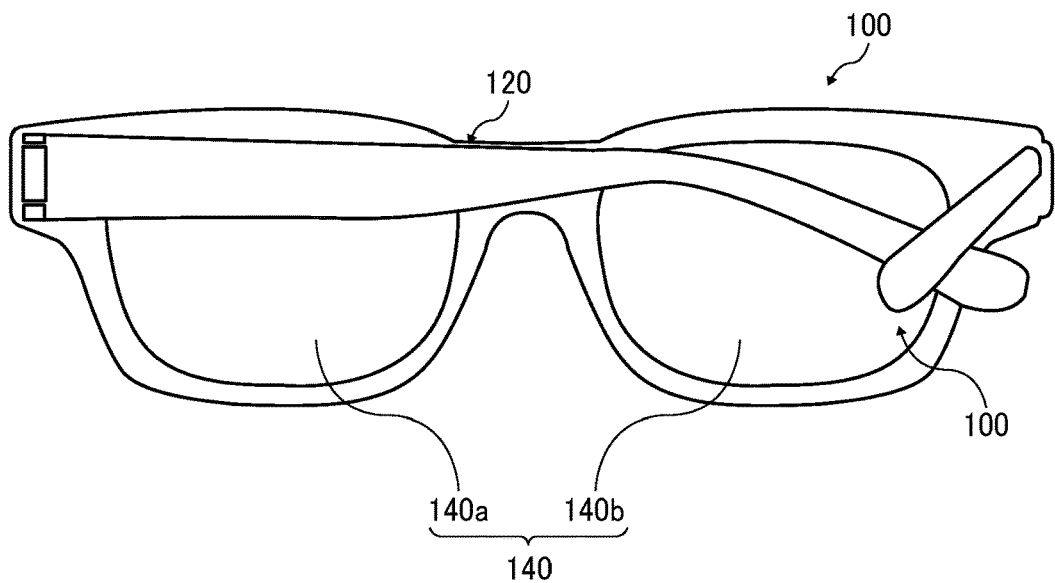
FIG. 17 is a view illustrating the glasses-type device when the left temple is folded, before the right temple is folded.
Figure 18:
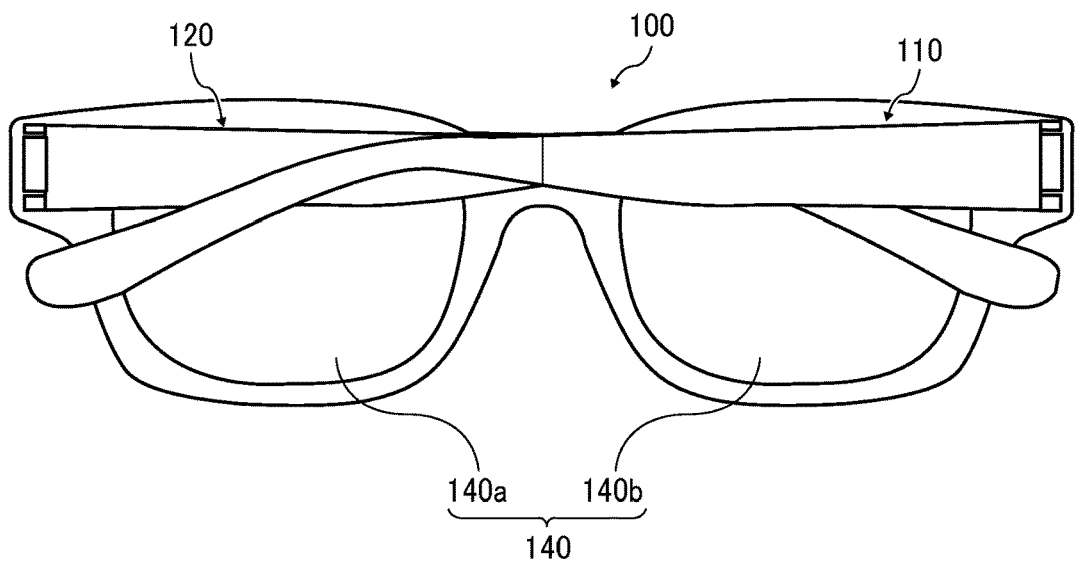
FIG. 18 is a view illustrating the glasses-type device when both of the right temple and left temple are folded.

In regard to the ordinary glasses, in the case where the temples are folded from the hinges, from the state in which the temples are opened as illustrated in FIG. 16, the left temple 120 is folded first before the right temple 110 is folded as illustrated in FIG. 17. Referring to FIG. 18, in the case where the left and right temples 110 and 120 of the glasses-type device 100 of the present embodiment are folded just as described, and the glasses-type device 100 is placed with the EC lens 140 being positioned on an upper side, the right temple 110 is positioned under the left temple 120. Accordingly, the power supply unit 112 for the wireless power supply is provided on the right temple 110 side. In this way, at the time of charging, the ear hook of the left temple 120 does not physically hinder the charging at a position between the power-receiving coil of the power supply unit 112 and the power-transmitting coil of the charger. This makes it easier to charge.

Figure 19:
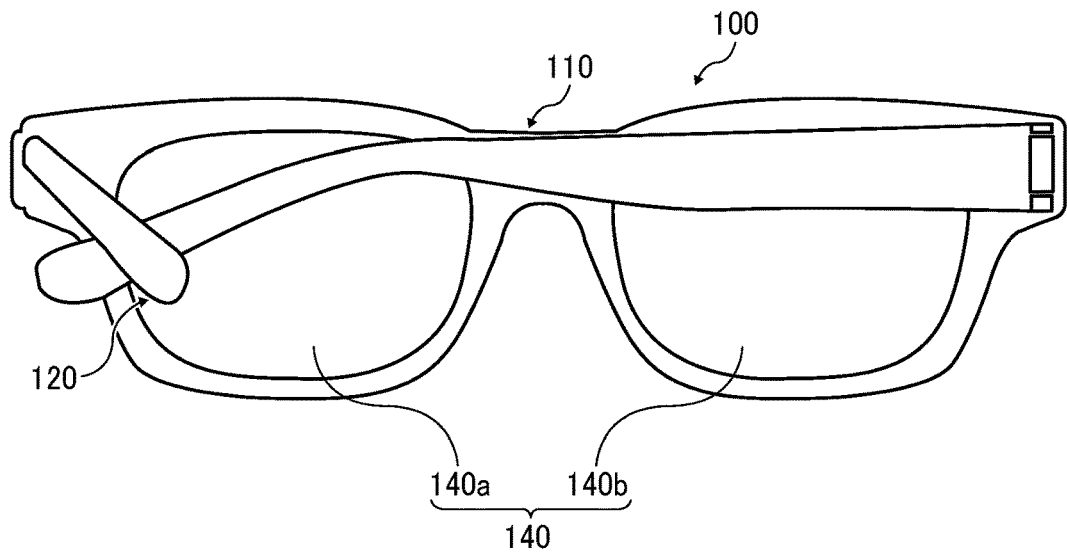
FIG. 19 is a view illustrating a glasses-type device having a power supply unit on the left temple, when the right temple is folded, before the right temple is folded.

With the above-described configuration, the power supply unit 112 is disposed in the right temple 110, and the control unit 122 is disposed in the left temple 120. However, the present invention is not limited to thereto, and arrangement of these units may be reversed left and right, for example, as illustrated in FIG. 19. The glasses-type device of FIG. 19 includes the power supply unit 112 on the left temple, and the control unit 122 on the right temple.

In addition, each of the power supply unit 112 and the control unit 122 is in a form of a unit. However, the present invention is not limited thereto, and the members provided therein may individually be configured and disposed, for example.

<<Right Temple>>

Figure 2A:
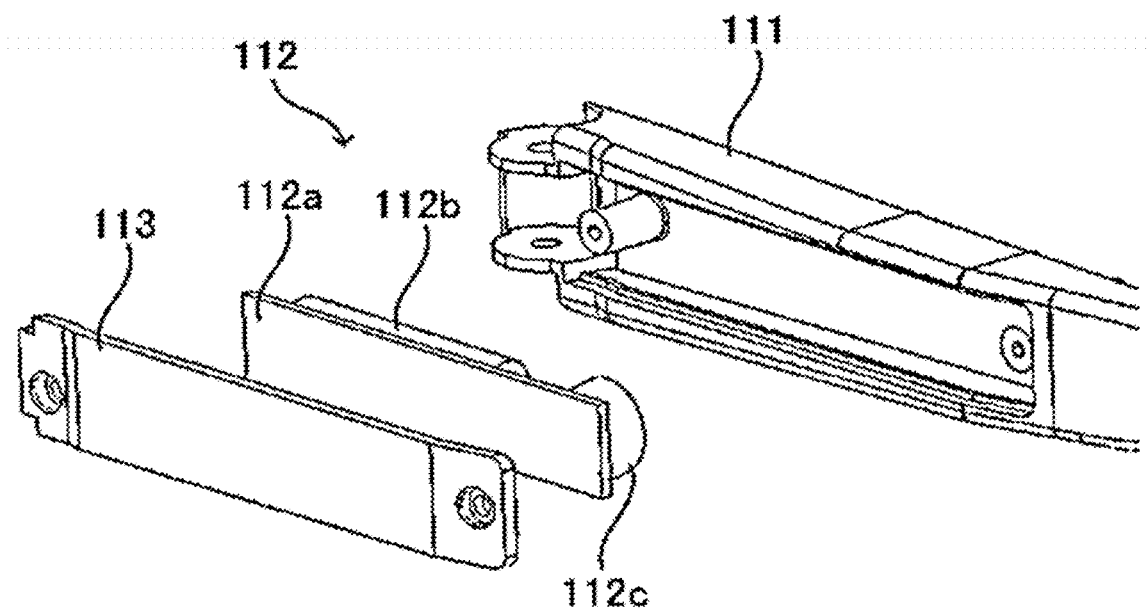
FIG. 2A is an exploded view of an example of a right temple of the glasses-type device illustrated in FIG. 1.
Figure 2B:
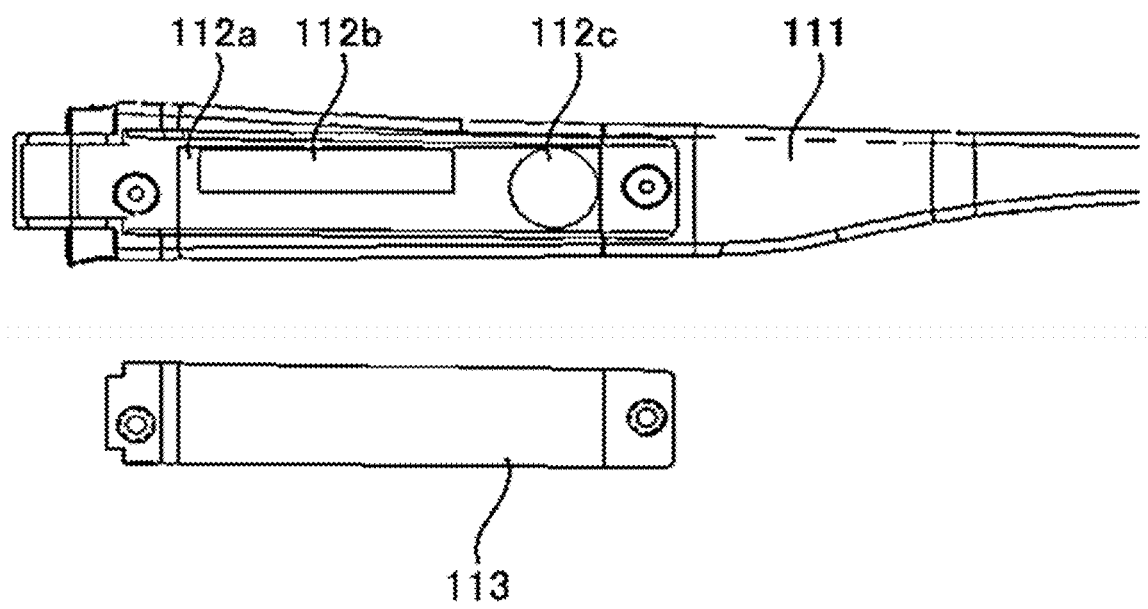
FIG. 2B is an exploded side view of the example of the right temple of the glasses-type device illustrated in FIG. 1.

FIG. 2A is an exploded view of an example of the right temple 110 of the glasses-type device 100. FIG. 2B is an exploded side view of the example of the right temple 110.

The right temple 110 includes: a right temple base body 111; the power supply unit 112 that is embedded in a portion of the right temple base body 111 on the hinge HR1 side; and a right temple cover 113 that is screwed to the right temple base body 111 in a manner to cover the power supply unit 112.

More specifically, the power supply unit 112 is screwed together with the right temple cover 113 from an inner side (a human body side at the time when the glasses-type device is worn) to an outer side of the right temple 110. In this way, nothing exists on the outer side of the right temple 110, which improves appearance. However, conversely, the power supply unit 112 may be screwed together with the right temple cover 113 from the outer side (the outer side at the time when the glasses-type device is worn) to the inner side of the right temple 110.

Power Supply Unit

The power supply unit 112 can be charged by wireless power transmission from the charger, which will be described later, and stably supplies the power to the control unit 122, which is disposed in the left temple 120 and will be described later.

The power supply unit 112 includes a circuit board 112a, a secondary battery 112b, and a power-receiving coil 112c.

The circuit board 112a has a rectangular shape so as to be able to be embedded in the right temple base body 111.

As illustrated in FIG. 2B, on the circuit board 112a, the secondary battery 112b is disposed in the vicinity of the hinge HR1, and the power-receiving coil 112c is disposed at a position farther away from the hinge HR1 than the secondary battery 112b.

Figure 3:
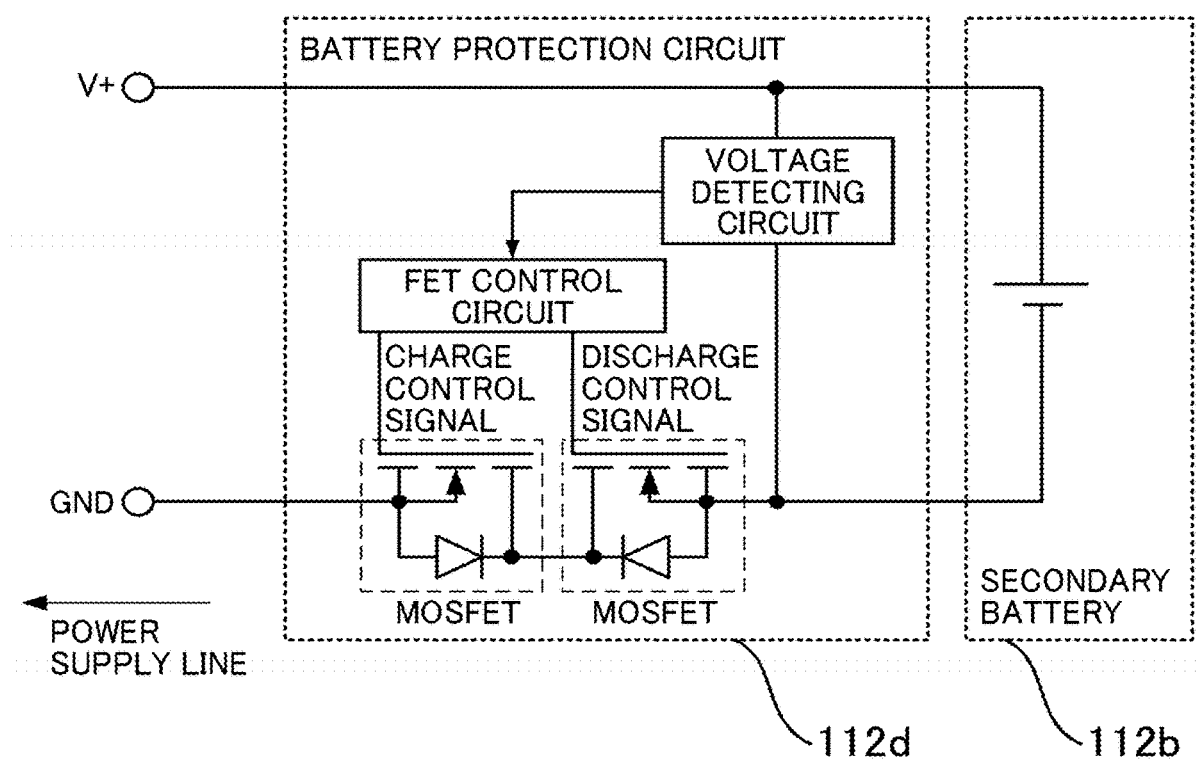
FIG. 3 is a diagram of an example of a battery protection circuit of the glasses-type device illustrated in FIG. 1.

As illustrated in FIG. 3, a battery protection circuit 112d is also provided on the circuit board 112a.

FIG. 3 is a circuit diagram of an example of the battery protection circuit 112d.

The battery protection circuit 112d protects the secondary battery 112b against overcharge, overdischarge, and an overcurrent. In the present embodiment, the battery protection circuit 112d is implemented by an integrated circuit (IC). The battery protection circuit 112d includes a voltage detecting circuit, a field-effect transistor (FET) control circuit, and a metal-oxide-semiconductor field-effect transistor (MOSFET). The voltage detecting circuit sends a detection value, which is acquired by detecting a charge voltage or a discharge voltage of the secondary battery 112b, to the FET control circuit. The FET control circuit compares the detection value by the voltage detecting circuit and a threshold, which is set in advance. Based on the comparison, the FET control circuit sends a charge control signal or a discharge control signal to the MOSFET, subjects the MOSFET into switching control of ON/OFF, and thereby protects the secondary battery 112b.

In FIG. 3, the protection MOSFET is placed on a ground (GND) side but may be placed on a V+ side (high side).

Referring to FIG. 2A, the secondary battery 112b is electrically connected to the circuit board 112a via the battery protection circuit 112d.

As the secondary battery 112b, an arbitrary DC power supply, such as a lithium-ion battery or a nickel-cadmium battery, can be used. The secondary battery 112b can apply a voltage of plus-minus several V to the EC lens 140.

The power-receiving coil 112c receives the power used to charge the secondary battery 112b by the wireless power supply. The power-receiving coil 112c is electrically connected to the circuit board 112a.

At the time of the charging, charging efficiency is degraded in the case where a board or the like exists between the power-receiving coil 112c and the power-transmitting coil of the charger and a clearance therebetween is increased. In view of this, when being embedded in the right temple base body 111, the power-receiving coil 112c is disposed on the outermost side in the power supply unit 112 (an opposite side from the human body side at the time when the glasses-type device is worn).

In the glasses-type device 100 according to the present embodiment, the power-receiving coil 112c is heavier than the secondary battery 112b. Thus, the power-receiving coil 112c is disposed at the position away from the hinge HR1, such that the center of gravity of the power supply unit 112 is set at a position away from the hinge HR1.

In the case where the power-receiving coil 112c is disposed at the position away from the hinge HR1, engagement of a portion of the right temple 110 near the power-receiving coil 112c is facilitated in comparison with a case where the power-receiving coil 112c is disposed near an end of the right temple 110. In this way, the power-receiving coil 112c and the power-transmitting coil can accurately be aligned. The accurate alignment between the power-receiving coil 112c and the power-transmitting coil allows the efficient charging.

The electromagnetic induction method is adopted as the wireless power supply method in the present embodiment. However, the wireless power supply method is not limited thereto, and a magnetic resonance method or the like may be adopted, for example.

In addition, in the case where wired charging has to be conducted instead of contactless power supply, such a structure is adopted that a connecting portion such as a connector is provided in the power supply unit 112 or that the power supply unit 112 is wired to an external contact portion for the charging. In this way, the structure that allows the wired charging can be adopted.

For example, as illustrated in FIG. 15, it can be configured that a Universal Serial Bus (USB) connector 101 is disposed instead of the wireless power supply coil, and a normal USB cable is used for the charging.

<<Left Temple>>

Figure 4A:
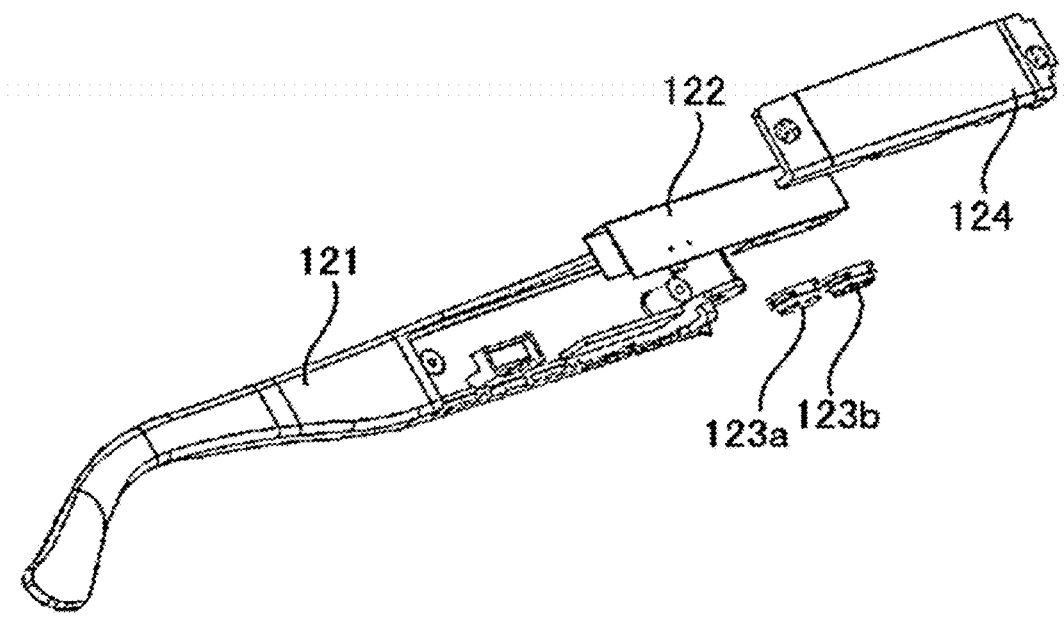
FIG. 4A is an exploded view of an example of a left temple of the glasses-type device illustrated in FIG. 1.
Figure 4B:
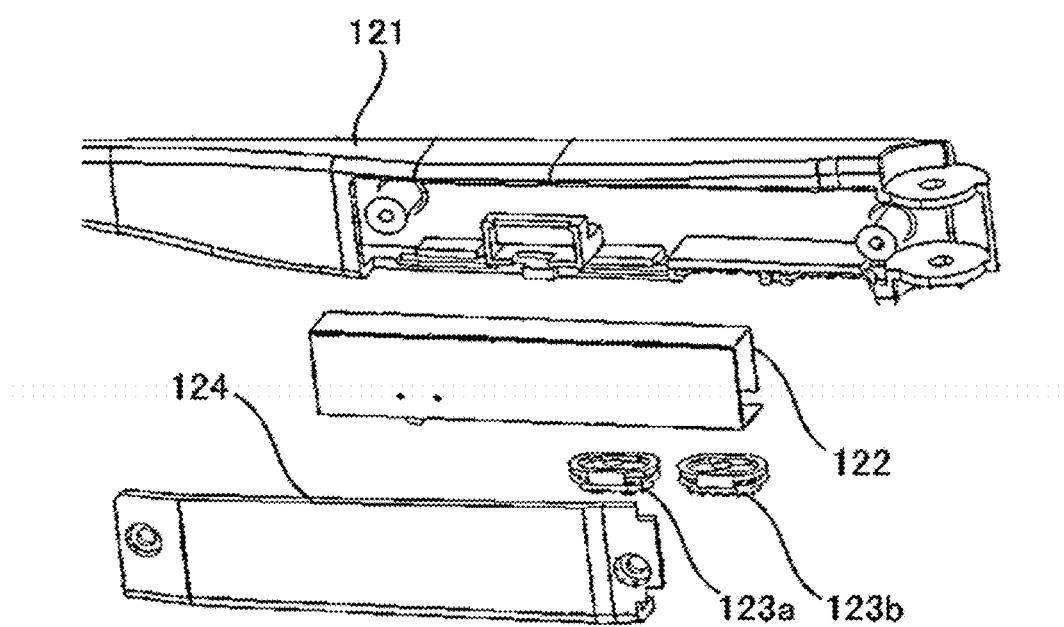
FIG. 4B is another exploded view of the example of the left temple of the glasses-type device illustrated in FIG. 1.
Figure 4C:
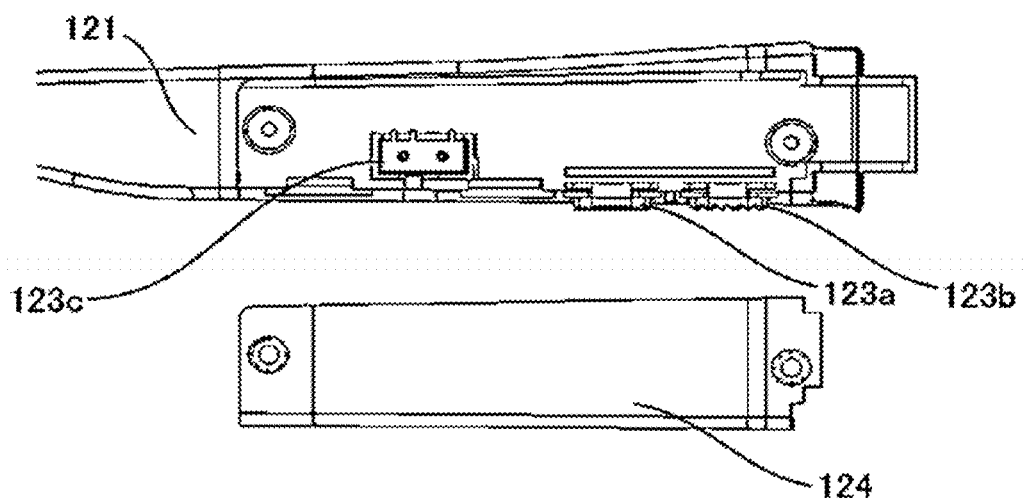
FIG. 4C is an exploded side view of the example of the left temple of the glasses-type device illustrated in FIG. 1.

FIG. 4A is an exploded view of an example of the left temple 120 illustrated in FIG. 1. FIG. 4B is an exploded view of the example of the left temple 120 with a different viewpoint from that of FIG. 4A. FIG. 4C is an exploded side view of the example of the left temple 120.

The left temple 120 includes: a left temple base body 121; the control unit 122 that is embedded in a portion of the left temple base body 121 on the hinge HL1 side; and a left temple cover 124 that is screwed to the left temple base body 121 in a manner to cover the control unit 122.

More specifically, the control unit 122 is screwed together with the left temple cover 124 from an inner side (the human body side at the time when the glasses-type device is worn) to an outer side of the left temple 120. With this configuration, nothing exists on the outer side of the left temple 120, which improves the appearance. However, conversely, the control unit 122 may be screwed together with the left temple cover 124 from the outer side (a lateral side opposite from a temple face side at the time when the user wears the glasses-type device 100) to the inner side of the left temple 120.

In the present embodiment, the temple covers 113 and 124 are screwed to the left and right temple base bodies 111 and 121, respectively. However, the present invention is not limited thereto. For example, a fitting claw method, a method for providing a waterproof function, or the like may be adopted.

Control Unit

The control unit 122 controls the light transmittance of the EC lens 140 by the voltage supplied from the power supply unit 112 of the right temple 110 via power supply lines.

The control unit 122 includes a drive circuit for driving the EC lens 140 and a central processing unit (CPU), on the flexible substrate 150 that is provided in a rib structure as a casing. The control unit 122 also includes the operating unit 123 that is electrically connected to the flexible substrate 150 provided in the rib structure.

The rib structure of the control unit 122 has a rectangular shape so as to be able to be embedded in the left temple base body 121.

In the rib structure of the control unit 122, the second button 123b and the first button 123a, as an example of the operating unit 123, are disposed in order from the vicinity of the hinge HL1 side.

In addition, as illustrated in FIG. 4C, in the left temple base body 121, the power supply switch 123c, as the slide switch, is disposed at a position farther away from the hinge HL1 than the second button 123b and the first button 123a in an area where a board of the control unit 122 is disposed.

In the present embodiment, the slide switch is used as the power supply switch 123c. However, the power supply switch 123c is not limited thereto, and an arbitrary switch such as a noncontact touch sensor or a push switch may be used.

In addition to the power supply switch 123c, the power may be turned on/off by an electronic circuit mounted on a circuit, which provides protection against the overcharge and the overdischarge, in the power supply unit 112. Alternatively, when a battery voltage is reduced, the power may automatically be turned OFF by the battery protection circuit 112d of the secondary battery 112b. Then, when the battery voltage is recovered by the charging, the power may automatically be turned ON.

Furthermore, in the present embodiment, the rib structure is used as the casing of the control unit 122. However, the casing of the control unit 122 is not limited thereto. For example, a structure that provides mechanical strength by screwing, fitting, adhesion, or the like may be used.

The operating unit 123 is provided with the first button 123a and the second button 123b.

When the user presses one of the first button 123a and the second button 123b, the voltage applied to the EC lens 140 is changed, so as to control the light transmittance of the EC lens 140.

More specifically, for the light transmittance of the EC lens 140, the voltage is applied to the EC lens 140, so as to cause an electrochromic layer of the EC lens 140, which will be described later, to undergo an oxidation-reduction reaction due to exchange of electrons, and the color is thereby produced or disappears. This changes light transmittance of the EC lens 140.

In addition, since the user operates the first button 123a and the second button 123b, a certain amount of a force is applied to the rib structure. Thus, a holding portion is provided in the rib structure to secure the mechanical strength.

The first button 123a and the second button 123b are disposed on a lower surface of the left temple 120 when the user wears the glasses-type device 100 of the present embodiment. As a result, the user holds at least one of the first button 123a and the second button 123b with fingers and thus can easily operate the first button 123a and the second button 123b. In addition, entry of dust, hair, or the like through a clearance between each of the buttons 123a, 123b and the left temple base body 121 is eliminated.

In the present embodiment, the buttons 123a and 123b in the operating unit 123 are disposed on the lower surface of the left temple 120 when the user wears the glasses-type device 100. However, the present invention is not limited thereto. For example, the buttons 123a and 123b may be disposed on at least one of the lateral surface opposite from the temple face side, an upper surface, and the lower surface.

Each of the first button 123a and the second button 123b is heavier than the power supply switch 123c and thus is disposed in the vicinity of the hinge HL1. In this way, center of gravity of the control unit 122 is set in the vicinity of the hinge HR1.

Here, each of the power supply unit 112 and the control unit 122 may have the waterproof function so as to prevent failure of an electronic circuit portion caused by entry of water such as rain.

In the control unit 122, a lamp indicative of ON/OFF of the power, an indicator indicative of operation at the time of driving, and the like may further be disposed.

In the glasses-type device 100 of the present embodiment, as described above, the center of gravity of the power supply unit 112 is set at the position away from the hinge HR1, and the center of gravity of the control unit 122 is set at the position near the hinge HL1. Just as described, the position of the center of gravity of the control unit 122 and the position of the center of gravity of the power supply unit 112 are asymmetric about the straight line that is orthogonal to the width direction (longitudinal direction) of the rim and passes through the center of the rim. In such a case, a load of the entire glasses-type device 100 is not concentrated on the nose pads or the ear hooks, and the load of the glasses-type device 100 is distributed. This reduces a load at the time of wearing and improve the wearing comfort.

Figure 5A:
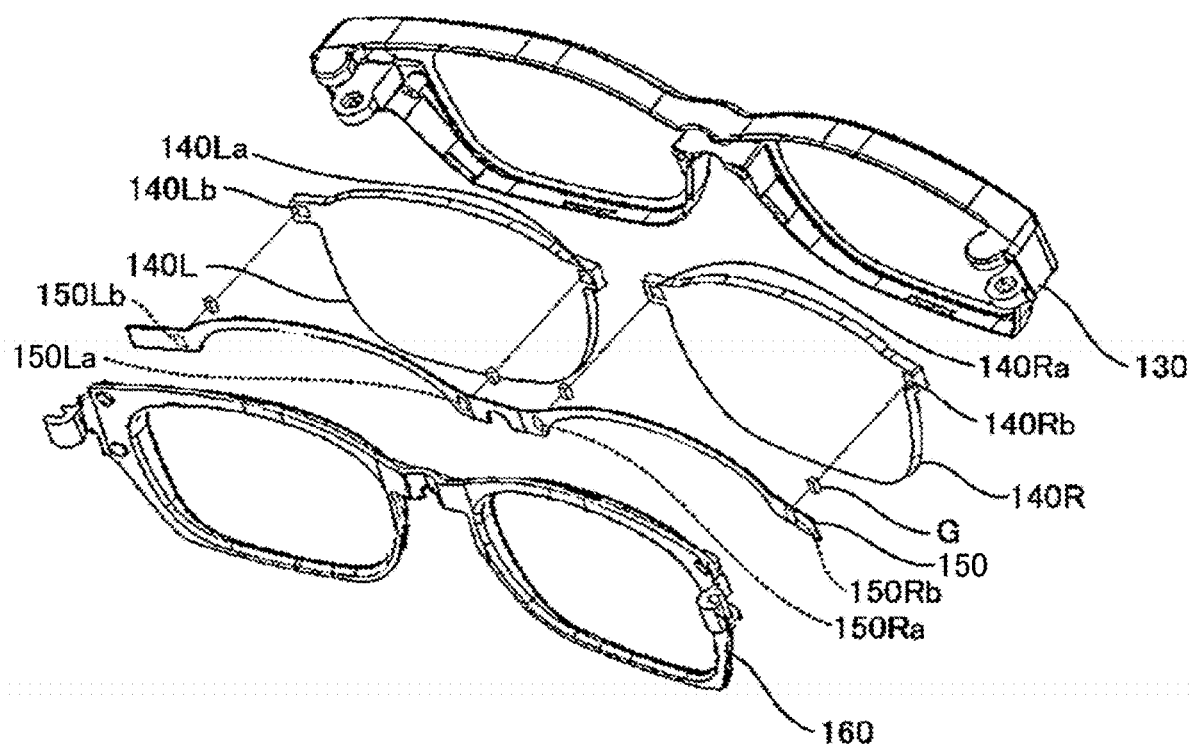
FIG. 5A is an exploded view of an example of a front rim, an EC lens, a flexible substrate, and a rear rim of the glasses-type device illustrated in FIG. 1.
Figure 5B:
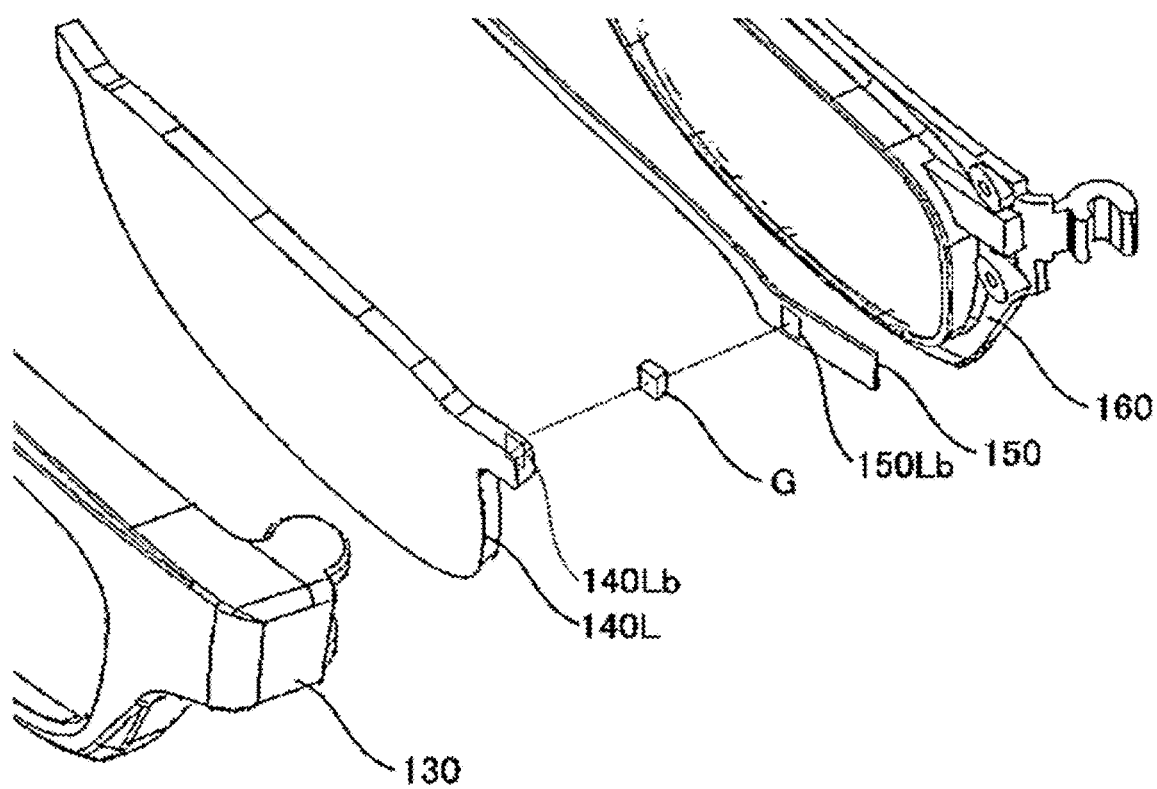
FIG. 5B is an exploded view of an example of conductive rubber that is disposed between the EC lens and the flexible substrate of the glasses-type device illustrated in FIG. 1.

FIG. 5A is an exploded view of an example of the front rim, the EC lens, the flexible substrate, and the rear rim of the glasses-type device 100. FIG. 5B is an exploded view of an example of conductive rubber that is disposed between the EC lens and the flexible substrate.

On a front surface (one surface) of the flexible substrate 150, four conductive portions 150Ra, 150Rb, 150La, and 150Lb are disposed so as to be electrically connected to four conductive portions 140Ra, 140Rb, 140La, and 140Lb of the EC lens 140, respectively, via conductive rubber G.

The front rim 130 and the rear rim 160 are fitted to each other in a manner to hold the EC lens 140 and the flexible substrate 150 therebetween, and are secured by screwing. At this time, four pieces of the conductive rubber G made of silicon are provided between the respective four conductive portions 140Ra, 140Rb, 140La, and 140Lb of the EC lens 140 and the respective four conductive portions 150Ra, 150Rb, 150La, and 150Lb of the flexible substrate 150. As a result, when the front rim 130 and the rear rim 160 hold the EC lens 140 and the flexible substrate 150 therebetween, the EC lens 140 and the flexible substrate 150 can electrically be connected to each other via the conductive rubber G.

In the present embodiment, as illustrated in FIGS. 5A and 5B, for example, such a mode that the conductive rubber G is held between the conductive portion 140Lb of an EC lens 140L and the conductive portion 150Lb of the flexible substrate 150 is adopted. However, the present invention is not limited thereto, and another mode may be adopted. As another mode, for example, the substrate may be disposed on both surfaces of the EC lens 140, and the conductive rubber G may be held between the EC lens and each of the flexible substrate.

In the present embodiment, the front rim 130 and the rear rim 160 are screwed. However, the present invention is not limited thereto, and the fitting claw method may be adopted, for example.

In addition, in the present embodiment, the conductive rubber G is used for the electrical connection between the EC lens 140 and the flexible substrate 150. However, the present invention is not limited thereto, and the EC lens 140 and the flexible substrate 150 may be pressed directly for the electrical connection therebetween, for example.

Furthermore, in the present embodiment, although the rim and a bridge are integrated. However, the present invention is not limited thereto. For example, even in the case where a structure of combining the rim and the bridge is adopted, it may be structured that the rim and the bridge are divided to provide a wire and a lens holding portion.

The front rim 130 has the hinge HR2 and the hinge HL2 at both ends in the width direction (longitudinal direction). In addition, the front rim 130 is integrally formed with the nose pad.

In the present embodiment, the nose pad is integrated. However, the present invention is not limited thereto, and the nose pad may separately be provided from the rim.

Figure 5C:
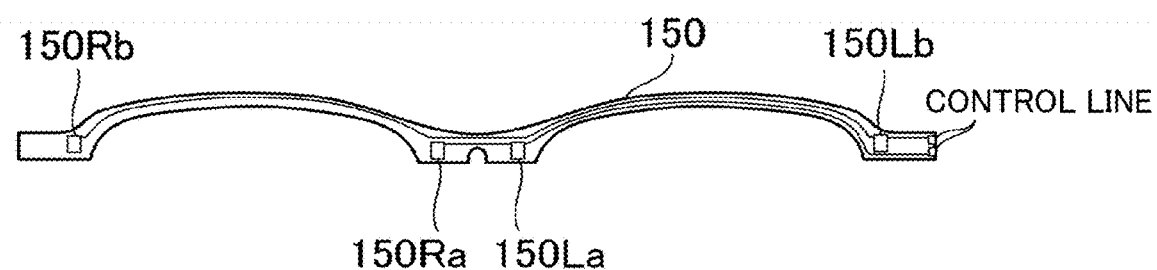
FIG. 5C is a schematic front view of an example of a control line and a conductive portion disposed on one surface of the flexible substrate illustrated in FIG. 5A.

As illustrated in FIGS. 5B and 5C, on the front surface (one surface) of the flexible substrate 150, the conductive portions 150Ra, 150Rb, 150La, and 150Lb are disposed so as to be electrically connected to the respective conductive portions 140Ra, 140Rb, 140La, and 140Lb of the EC lens 140 via the conductive rubber G. In addition, control lines are formed on the front surface of the flexible substrate 150. The conductive portions 150Ra and 150La are electrically connected to each other by one of the control lines while the conductive portions 150Rb and 150Lb are electrically connected to each other by the other control line.

Figure 5D:
FIG. 5D is a schematic back view of an example of a power supply line disposed on another surface of the flexible substrate illustrated in FIG. 5A.

Meanwhile, as illustrated in FIG. 5D, on a back surface (the other surface) of the flexible substrate 150, a pair of the conductive power supply lines, through which the power supply unit 112 supplies the power to the control unit 122 provided with the operating unit 123, is formed.

That is, on the back surface side of the flexible substrate 150, a first conductive path pair as a first conductive unit is formed to electrically connect the power supply unit provided in one of the temples and the control unit provided in the other temple.

Figure 8:
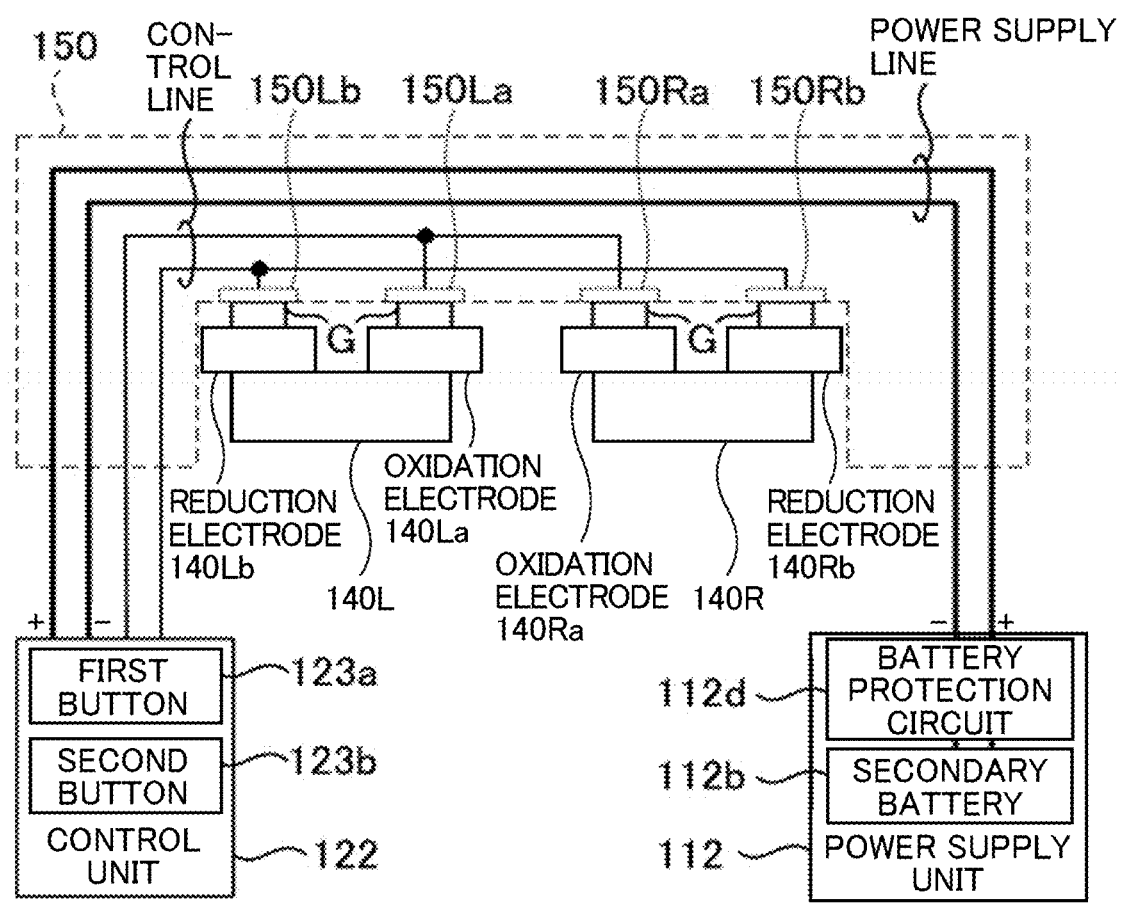
FIG. 8 is a connection diagram of an example of electrical connection among portions in the glasses-type device illustrated in FIG. 1.

In addition, on the front surface side of the flexible substrate 150, a second conductive path pair as a second conductive unit is formed to electrically connect the control unit provided in the temple and the EC lens. More specifically, as illustrated in FIG. 8, on the front side of the flexible substrate 150, the conductive path, which electrically connects the control unit 122 and each of the conductive portions (reduction electrodes) 140Lb and 140Rb of the EC lens 140, and the conductive path, which electrically connects the control unit 122 and each of the conductive portions (oxidation electrodes) 140Ra and 140La, are provided. These conductive paths form the second conductive path pair to electrically connect the control unit and the lens.

In the present embodiment, the control lines and the power supply lines are collectively disposed on the single flexible substrate. However, the present invention is not limited thereto. The control lines and the power supply lines may respectively be provided on the separate flexible substrates, and those flexible substrates may be superimposed on each other.

Figure 6A:
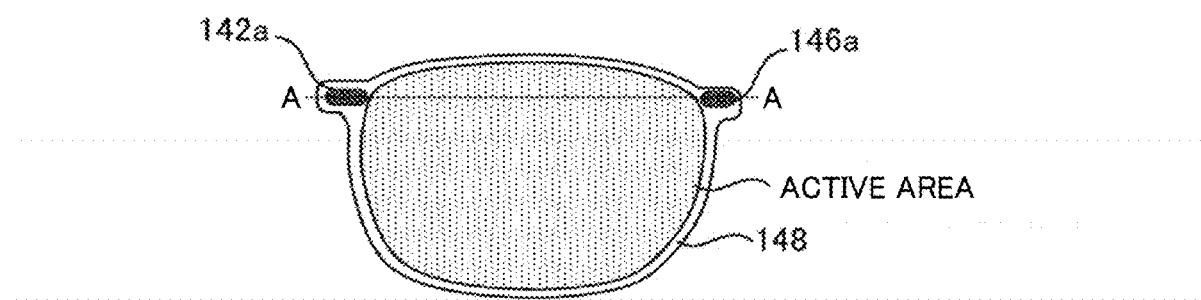
FIG. 6A is a schematic front view of an example of the EC lens of the glasses-type device illustrated in FIG. 1.

FIG. 6A is a schematic front view of an example of the EC lens 140.

As illustrated in FIG. 6A, when viewed from the front, the EC lens 140 has an active area, where the light transmittance varies according to the applied voltage, on the inside. In addition, in the EC lens 140, an outer periphery of the layer is covered with a protective layer 148. A convex portion is provided on each of lateral surfaces in FIG. 6A, and a first auxiliary electrode 142a and a second auxiliary electrode 146a are disposed in the convex portions.

The outer periphery of the EC lens 140, which is covered with the protective layer 148, is the area where the light transmittance is not changed. Thus, even in the case where the light transmittance of the EC lens 140 is reduced for light control, the light enters from the outer periphery and worsens light control effect. Thus, the opaque colored protective layer 148 is desirably used to cover the outer periphery, or such frame design that the rim hides the protective layer 148 is desired.

Figure 6B:
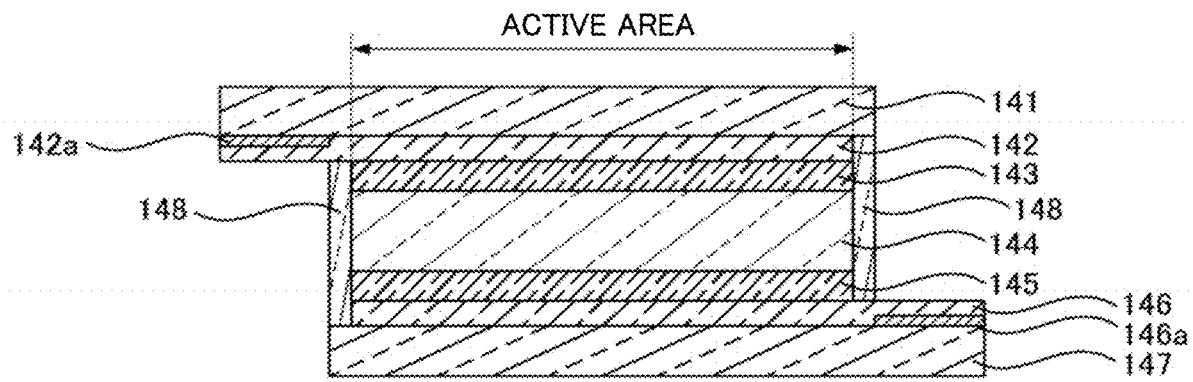
FIG. 6B is a schematic cross-sectional view of an example of a cross section that is taken along line A-A of the EC lens in FIG. 6A.

FIG. 6B is a schematic cross-sectional view of a cross section that is taken along line A-A of the EC lens in FIG. 6A.

As illustrated in FIG. 6B, the EC lens 140 is a laminated body in which a first transparent substrate 141, a first transparent electrode layer 142, the first auxiliary electrode 142a, an electrochromic layer 143, an electrolyte layer 144, and a deterioration prevention layer 145, a second transparent electrode layer 146, the second auxiliary electrode 146a, and a second transparent substrate 147 are laminated in this order. In addition, the EC lens 140 has the protective layer 148 on lateral surfaces of the laminated body excluding the first transparent substrate 141 and the second transparent substrate 147.

The EC lens 140 is formed by thermoforming the laminated body, and has a desired curved surface as the lens. The EC lens 140, which is formed of the laminated body, may have the desired curved surface at least for a part of the laminated body, or the entire laminated body.

In the EC lens 140, the voltage for the oxidation-reduction reaction is applied to the first transparent electrode layer 142 and the second transparent electrode layer 146 so as to charge. In this way, the electrochromic layer 143 undergoes the oxidation-reduction reaction due to the exchange of the electrons, and the color is thereby produced or disappears.

More specifically, for example, approximately 2 V of the voltage is applied to the first transparent electrode layer 142 and the second transparent electrode layer 146 so as to inject the electrons into the electrochromic layer 143. Then, the electrochromic material in the electrochromic layer 143 produces the color by the reduction reaction. Thereafter, in the case where the electrochromic material is in a reduction reaction state, the electrochromic material continues producing the color. Then, when the positive and negative voltages applied to the first transparent electrode layer 142 and the second transparent electrode layer 146 are reversed or shorted, the electrons are emitted from the electrochromic layer 143. in this way, the electrochromic material eliminates the color and becomes transparent.

In contrast to the above, due to a characteristic of the electrochromic material, there is an electrochromic material that undergoes an oxidation reaction to produce the color when the electrons are emitted from the electrochromic layer 143. In such a case, the electrochromic material continues producing the color in a state where the electrons are emitted from the electrochromic layer 143. Then, when the electrons are injected into the electrochromic layer 143, the electrochromic material eliminates the color and becomes transparent.

Transparent Substrate

The first transparent substrate 141 and the second transparent substrate 147 have a function of supporting the other layers.

The first auxiliary electrode 142a and the second auxiliary electrode 146a are provided to reduce contact resistance with the conductive rubber G.

A material of the transparent substrate is not particularly limited and can appropriately be selected according to a specific application. Examples of the material include, but not limited to, resin substrates such as a polycarbonate resin, an acrylic resin, a polyethylene resin, a polyvinyl chloride resin, a polyester resin, an epoxy resin, a melamine resin, a phenol resin, a polyurethane resin, and a polyimide resin. In addition, in order to enhance a water vapor barrier property, a gas barrier property, and visibility, a transparent insulating inorganic particle layer, an antireflection layer, or the like may be coated on a surface of the transparent substrate.

Transparent Electrode Layer

The voltage is applied to the first transparent electrode layer 142 and the second transparent electrode layer 146 so as to cause the electrochromic material to produce or eliminate the color.

A material of the transparent electrode layer is not particularly limited and can appropriately be selected according to a specific application. Examples of the material include, but not limited to, indium oxide doped with tin (may also be referred to as "ITO"), tin oxide doped with fluorine (may also be referred to as "FTO"), and tin oxide doped with antimony (may also be referred to as "ATO").

An average thickness of the transparent electrode layer is not particularly limited and can appropriately be selected according to a specific application. However, the average thickness of the transparent electrode layer is desirably adjusted such that an electrical resistance value for the oxidation-reduction reaction of the electrochromic layer is obtained. In the case where ITO is used, the average thickness of the transparent electrode layer is desirably equal to or greater than 50 nm and equal to or less than 500 nm.

Electrochromic Layer

The electrochromic layer 143 is a layer that contains the electrochromic material.

The electrochromic material is not particularly limited and can appropriately be selected according to a specific application. Examples of electrochromic material include, but not limited to, an inorganic electrochromic compound, an organic electrochromic compound, and a conductive polymer known to exhibit electrochromism.

Examples of the inorganic electrochromic compound are tungsten oxide, molybdenum oxide, iridium oxide, and titanium oxide.

Examples of the organic electrochromic compound are viologen, rare earth phthalocyanine, styryl, triphenylamine, and derivatives thereof.

Examples of the conductive polymer are polypyrrole, polythiophene, polyaniline, and derivatives thereof.

An average thickness of the electrochromic layer is not particularly limited and can appropriately be selected according to a specific application. However, the average thickness of the electrochromic layer is desirably equal to or greater than 0.2 μm and equal to or less than 5.0 μm. In the case where the average thickness of the electrochromic layer is less than 0.2 μm, it may be difficult to obtain sufficient color optical density. On the other hand, in the case where the average thickness of the electrochromic layer exceeds 5.0 μm, manufacturing cost may be increased, and the visibility may be reduced by coloring.

—Electrolyte Layer—

The electrolyte layer 144 is filled and formed between the first transparent electrode layer 142 and the second transparent electrode layer 146.

The electrolyte layer 144 is a layer that plays a role in ion conduction for moving the electrons among the first transparent electrode layer 142, the electrochromic layer 143, the deterioration prevention layer 145, and the second transparent electrode layer 146. In the EC lens 140, when the voltage is applied to the first transparent electrode layer 142 as the oxidation electrode and the second transparent electrode layer 146 as the reduction electrode, the electrons move among the layers. Then, in a direction of the voltage application, the electrochromic layer 143 undergoes the oxidation-reduction reaction due to the exchange of the electrons, and the color is thereby produced or disappears.

As an electrolyte contained in the electrolyte layer, a solution in which a solid electrolyte is dissolved in a solvent or a liquid electrolyte such as an ionic liquid is used.

As a material of the electrolyte, inorganic ion salt such as alkali metal salt or alkaline earth metal salt, quaternary ammonium salt, acid, or supporting salt of alkali can be used, for example. More specifically, $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, $Mg(BF_4)_2$ are exemplified. One type of these may be used alone, or two or more types of there may be used in combination. In addition, the ionic liquid that is formulated by combining cation components and anion components of these can be used.

Examples of the solvent for dissolving the solid electrolyte are propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxy ethane, polyethylene glycol, and alcohols. One type of these may be used alone, or two or more types of there may be used in combination.

The ionic liquid is not particularly limited, and a substance that is generally researched and reported can appropriately be used.

There is an organic ionic liquid that exhibits a liquid state in a wide temperature range including a room temperature, and includes the cationic component and the anionic component.

Examples of the cationic component are: imidazole derivatives such as N, N-dimethylimidazole salt, N, N-methylethylimidazole salt, and N, N-methylpropylimidazole salt; aromatic salts of pyridinium derivatives such as N, N-dimethylpyridinium salt and N, N-methylpropyl pyridinium salt; and aliphatic quaternary ammonium compounds of tetraalkyl ammonium and the like such as trimethylpropyl ammonium salt, trimethylhexyl ammonium salt, and triethylhexyl ammonium salt. One type of these may be used alone, or two or more types of there may be used in combination.

As the anion component, a compound that contains fluorine is desired in terms of stability in atmospheric air, and examples of the anion component are $BF_4—$, $CF_3SO_3—$, $PF_4—$, $(CF_3SO_2)_2N—$, $B(CN_4)—$.

As the electrolyte layer, the solid electrolyte is desired. In such a case, the electrolyte layer is formed as a film that holds the electrolyte in a photosetting resin or a thermosetting resin.

A solution, in which a curable resin, an electrolytic solution, further, optically transparent inorganic fine particles as additives, and the like are mixed, is produced between a first electrochromic layer and the deterioration prevention layer. Thereafter, such a solution is desirably cured by the light or heat.

Examples of the curable resin are general materials including the photosetting resins, such as the acrylic resin, a urethane resin, the epoxy resin, a vinyl chloride resin, an ethylene resin, the melamine resin, and the phenol resin, the thermosetting resin, and the like. Among these, a material having high compatibility with the electrolyte is desired.

Examples of such a material are derivatives of ethylene glycol such as polyethylene glycol and polypropylene glycol. In addition, as the curable resin, a photocurable resin is desirably used. This is because the electrochromic element can be produced at a low temperature and in a short time when compared to a method for forming a thin film by evaporating the solvent by thermal polymerization.

An average thickness of the electrolyte layer is not particularly limited and can appropriately be selected according to a purpose. However, the average thickness of the electrolyte layer is desirably equal to or greater than 100 nm and equal to or less than 10 μm.

Deterioration Prevention Layer

The deterioration prevention layer 145 plays a role in undergoing a reverse chemical reaction from the electrochromic layer 143 for balance of the charges, so as to suppress corrosion and deterioration of the second transparent electrode layer 146 by an irreversible oxidation-reduction reaction and to improve repeat stability of the EC lens 140. Thus, in the case where the material of the electrochromic layer 143 is of an oxidation coloring type, for example, a material of the deterioration prevention layer 145 is desirably a material that can undergo the reduction reaction.

Here, the reverse chemical reaction from the electrochromic layer 143 includes acting as a capacitor in addition to a case where the deterioration prevention layer 145 is oxidized and reduced.

A material of the deterioration prevention layer is not particularly limited and can appropriately be selected according to a specific application. One of an inorganic compound and an organic compound may be used, and, for example, the same material as the electrochromic layer can be selected.

Protective Layer

The protective layer 148 can protect the EC lens 140 against external stress and a chemical in a cleaning process, can also prevent leakage of the electrolyte, and can further prevent entry of objects, such as moisture and oxygen in the atmospheric air, that prevents stable operation of the EC lens 140.

A material of the protective layer is not particularly limited and can appropriately be selected according to a specific application. Examples of the protective layer are an ultraviolet curing adhesive and the thermosetting resin.

An average thickness of the protective layer is not particularly limited and can appropriately be selected according to a specific application. However, the average thickness of the protective layer is desirably equal to or greater than 1 μm and equal to or less than 200 μm.

Figure 7:
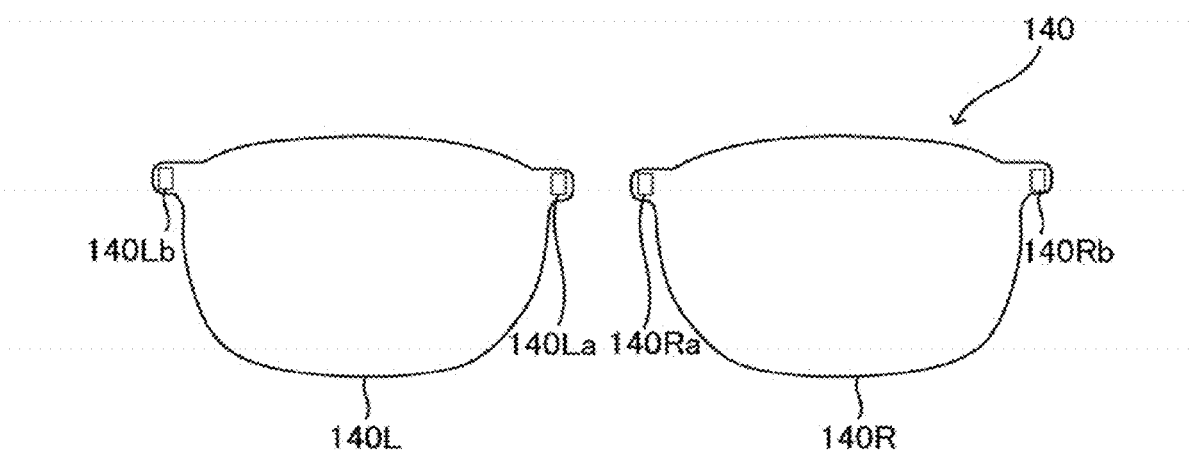
FIG. 7 is a schematic front view of an example of positions of an oxidation electrode and a reduction electrode in the EC lens of the glasses-type device illustrated in FIG. 1.

FIG. 7 is a schematic front view of an example of positions of the oxidation electrode and the reduction electrode in the EC lens 140.

As illustrated in FIG. 7, in the present embodiment, in the two EC lenses 140R and 140L, the conductive portions 140Ra and 140La close to each other are set as the oxidation electrodes, and the conductive portions 140Rb and 14Lb separated from each other are set as the reduction electrodes.

In the present embodiment, in the two EC lenses, the conductive portions close to each other are set as the oxidation electrodes, and the conductive portions separated from each other are set as the reduction electrodes. However, the present invention is not limited thereto, and the positions where the oxidation electrodes and the reduction electrodes are appropriately disposed can be selected.

FIG. 8 is a connection diagram of an example of electrical connection among portions in the glasses-type device 100.

As illustrated in FIG. 8, the secondary battery 112b of the power supply unit 112 is electrically connected to the pair of the power supply lines provided on the flexible substrate 150 via the battery protection circuit 112d. The pair of the power supply lines is electrically connected to the control unit 122. In this way, the power supply unit 112 can supply the power to the control unit 122.

The control unit 122 is connected to the conductive portions 140Ra and 140La, which are the oxidation electrodes of the left and right EC lenses 140R and 140L, respectively, via one of the control lines provided on the flexible substrate 150 and via the conductive rubber G. The control unit 122 is also connected to the conductive portions 140Rb and 140Lb, which are the reduction electrodes of the left and right EC lenses 140R and 140L, respectively, via the other control line and via the conductive rubber G. As a result, the control unit 122 can apply the same voltage to the left and right EC lenses 140R and 140L and generate the same potential difference. Thus, the light transmittance of the EC lenses 140R and 140L can be changed simultaneously and similarly. The voltage that is applied to the EC lenses 140R and 140L is changed when the user presses the first button 123a or the second button 123b.

(Charger)

Figure 9A:
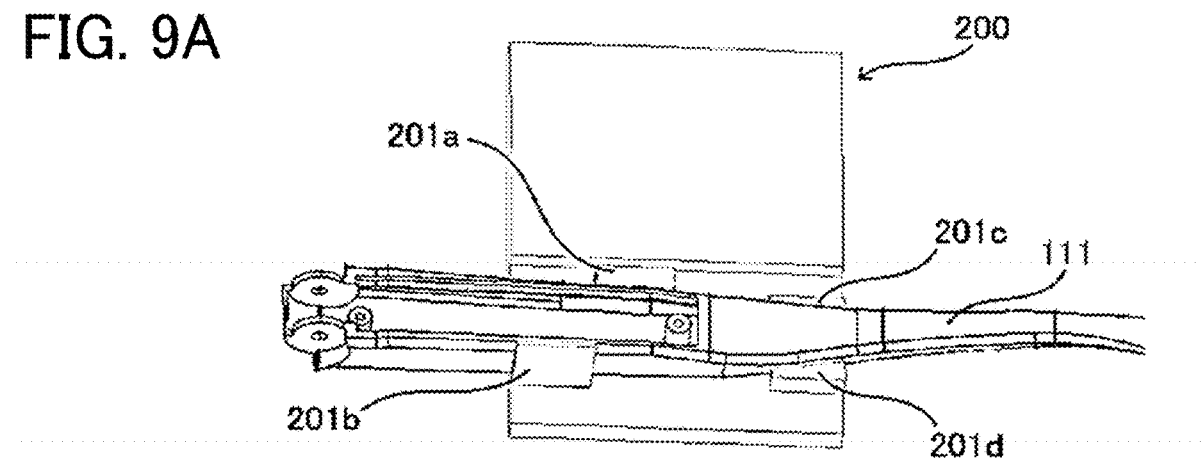
FIG. 9A is a perspective view of an example of the right temple of the glasses-type device illustrated in FIG. 1, being engaged with a charger during charging.
Figure 9B:
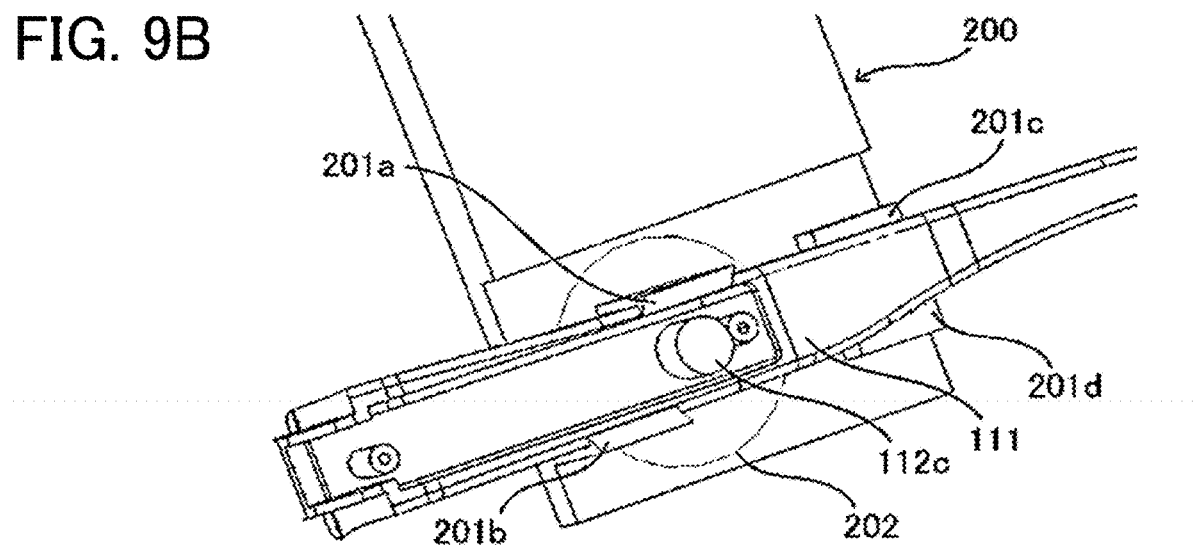
FIG. 9B is a perspective view of the example of the right temple when a viewpoint is changed from FIG. 9A.
Figure 9C:
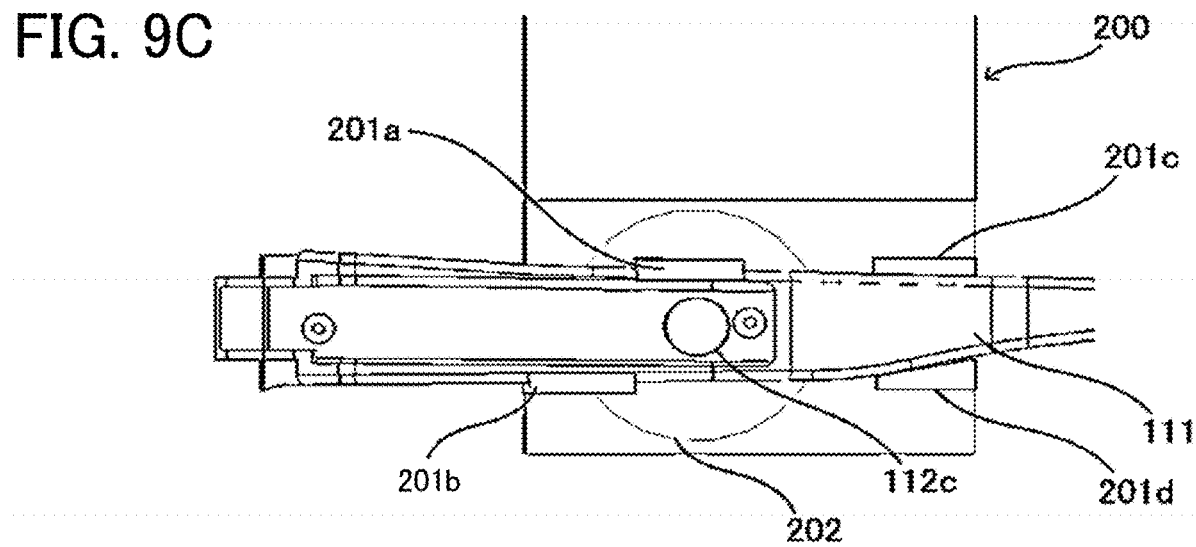
FIG. 9C is a schematic top view of the example of the right temple of the glasses-type device illustrated in FIG. 1.
Figure 20:
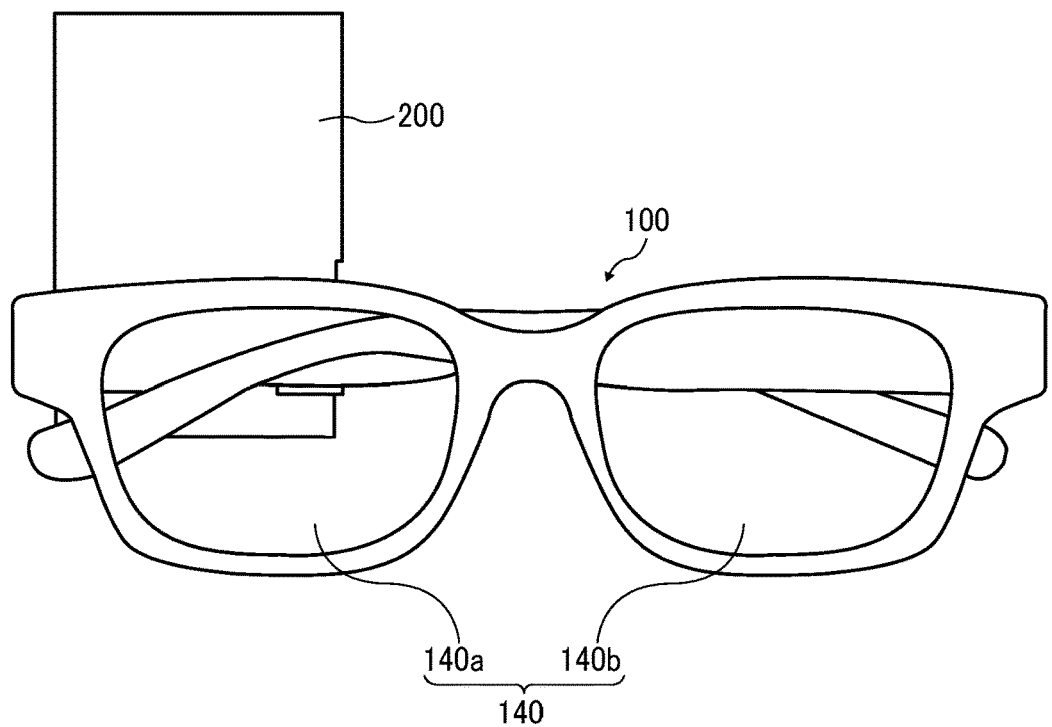
FIG. 20 is a top plan view illustrating the glasses-type device having the power supply unit being engaged with a charger.
Figure 21:
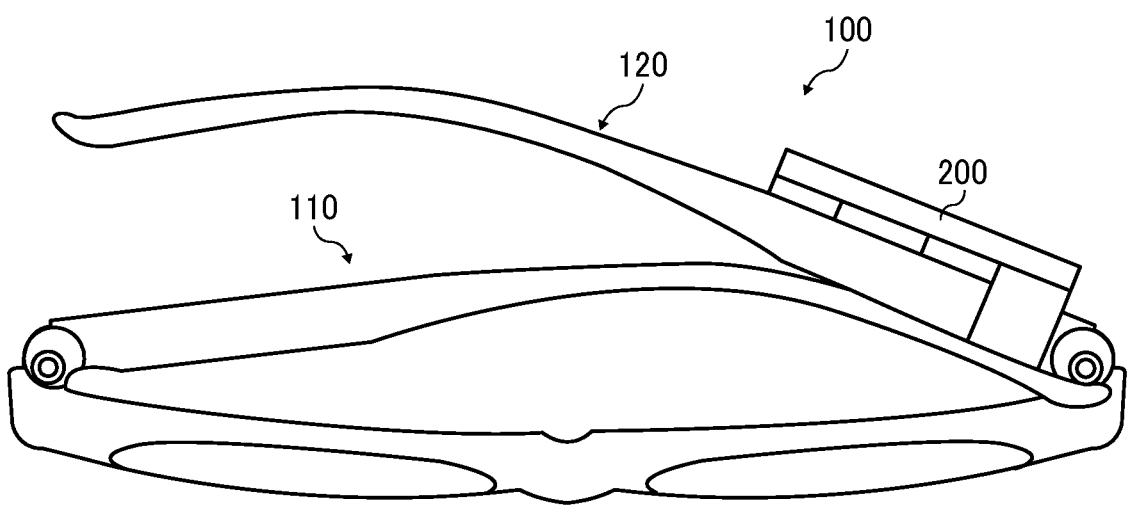
FIG. 21 is a view illustrating the glasses-type device having the power supply unit being engaged with the charger, viewed from a bottom face of the charger.

FIG. 9A is a perspective view of an example of the right temple 110 that is engaged with a charger 200 during the charging. FIG. 9B is a perspective view of the example of the right temple 110 when a viewpoint is changed from FIG. 9A. FIG. 9C is a schematic top view of the example of the right temple 110. FIG. 20 is a top plan view illustrating the charger 200 when engaged with the right temple 110. FIG. 21 is a view illustrating the charger 200 when engaged with the right temple 110, viewed from a lower surface of the charger 200.

As illustrated in FIG. 9A to FIG. 9C, the charger 200 includes: a guide structure 201 as an engaging portion; a power-transmitting coil 202 that is embedded in the charger 200; and base on which a circuit for supplying a high-frequency current to the power-transmitting coil 202 and the like are provided. As described below, the guide structure 201 has temple abutting portions 201c and 201d, and first and second claws 201a and 201b.

The guide structure 201 is provided to accurately align a center of the power-receiving coil 112c of the power supply unit 112 and a center of the power-transmitting coil 202 of the charger 200 for the efficient charging during the charging. For the accurate alignment, the guide structure 201 has such a shape that is engaged with a curved portion near a center of the right temple base body 111 in the longitudinal direction.

At the time of the charging, the temple abutting portions 201c and 201d abut the curved portion of the right temple base body 111, and the right temple base body 111 is engaged by using the first claw 201a and the second claw 201b.

A power supply of the charger 200 is not particularly limited and can appropriately be selected according to a specific application. Examples of the power supply are an external power supply and a battery dedicated for the charging.

The charger 200 may include the base on which the glasses-type device 100 can be placed. Accordingly, the glasses-type device 100 is placed on the base at the time of the charging. Thus, the glasses-type device 100 can stably be charged while a state where the center of the power-receiving coil 112c and the center of the power-transmitting coil 202 are accurately aligned is maintained.

As it has been described so far, in the glasses-type device according to the embodiment of the present invention, the power-receiving coil is disposed in one of the two temples. In this way, the size of the charger can be reduced, and the number of the components can be reduced. Therefore, the small inexpensive charger can be provided.

In addition, in the glasses-type device according to the embodiment of the present invention, the charger is engaged with the glasses-type device in a manner to follow the shape of the temple in which the power-receiving coil is disposed. Thus, the accurate alignment and efficient charging can be achieved.

Furthermore, in the glasses-type device according to the embodiment of the present invention, the power supply unit, which includes the power-receiving coil and the like, is provided in one of the temples, and the control unit, which includes the switches, is provided on the other temple. In this way, left-right weight balance of the glasses-type device can substantially be equalized. In the glasses-type device according to the embodiment of the present invention, the position of the center of gravity of the power supply unit and the position of the center of gravity of the control unit are made asymmetric about the straight line that is orthogonal to the width direction (longitudinal direction) of the rim and passes through the center of the rim.

As a result, the glasses-type device according to the embodiment of the present invention can prevent the excessive load of the glasses-type device from being applied to one of the nose pad (pad arm) and the ear hook (end tip), and can improve the wearing comfort. Thus, the user can spend comfortably even when wearing the glasses-type device for the long time.

In the present embodiment, the lens using the electrochromic element is adopted as an electroactive lens. However, the electroactive lens is not limited thereto. For example, a lens using a liquid crystal element, or the like may be adopted. In such a case, when compared, the electrochromic element and the liquid crystal element differ in terms of driving voltage and power consumption. As the specific driving voltage, the voltage that is applied between terminals of the liquid crystal element is generally 3 V to 5 V, and the voltage that is applied between terminals of the electrochromic element is 2 V or less.

The power consumption tends to be increased because the voltage has to keep being applied to the liquid crystal element. Meanwhile, during driving, the power consumption by the electrochromic element can be reduced by pulse driving.

In the present embodiment, the description has been made on the glasses-type device using the EC lens as the example. However, the present invention is not limited thereto. For example, the present invention can be applied to a glasses-type device that has a unit generating sound such as a speaker. As another example, the present invention can be applied to a glasses-type device that has a unit for displaying an image such as a monitor and to a glasses-type device that has a detecting unit such as a biological sensor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A glasses-type device comprising:
   a lens support body to support a pair of lenses;
   a first temple attached to the lens support body via one or more hinges, the first temple including a power supply at a position closer to the hinges than to a first ear hook;
   a second temple attached to the lens support body via one or more hinges, the second temple including a controller at a position closer to the hinges than to a second ear hook, the controller having a user interface operably by a user wearing the glasses-type device; and
   a flexible substrate including a first side and a second side, the first side including a first conductor to electrically connect the power supply and the controller, and the second side including a second conductor to electrically connect the controller and conductive portions of the lenses.

2. The glasses-type device according to claim 1, wherein a distance from an end of one of the first temple and the second temple facing the lens support body to a position of the center of gravity of the one temple, and a distance from an end of another one of the first temple and the second temple facing the lens to a position of the center of the gravity of the another temple, is made different from each other.

3. The glasses-type device according to claim 1, wherein the power supply receives electric power wirelessly.

4. The glasses-type device according to claim 1, wherein the first temple which includes the power supply is a right temple, and the second temple which includes the controller is a left temple.

5. The glasses-type device according to claim 1, wherein the first temple includes the power supply and is a left temple, and the second temple includes the controller and is a right temple.

6. The glasses-type device according to claim 1, wherein at last one of the first ear hook and the second ear hook is deformable in shape.

7. A charger for charging the glasses-type device according to claim 1, comprising:
   a power-transmitting coil to wirelessly transmit electric power to a power-receiving coil of the power supply; and
   a guide structure having a shape that is fitted into a shape of the temple, when the glasses-type device is engaged with the charger.

8. A glasses-type device comprising:
   a lens support body to support a pair of lenses;
   a first temple attached to the lens support body via one or more hinges, the first temple including a power supply at a position closer to the hinges than to a first ear hook;
   a second temple attached to the lens support body via one or more hinges, the second temple including a controller at a position closer to the hinges than to a second ear hook, the controller having a user interface operably by a user wearing the glasses-type device; and
   means for supporting conductors including a first side and a second side, the first side including a first conductor to electrically connect the power supply and the controller, and the second side including a second conductor to electrically connect the controller and conductive portions of the lenses.

9. The Masses-type device according to claim 8, wherein a distance from an end of one of the first temple and the second temple facing the lens support body to a position of the center of gravity of the one temple, and a distance from an end of another one of the first temple and the second temple facing the lens to a position of the center of the gravity of the another temple, is made different from each other.

10. The glasses-type device according to claim 8, wherein the power supply receives electric power wirelessly.

11. The glasses-type device according to claim 8, wherein the first temple which includes the power supply is a right temple, and the second temple which includes the controller is a left temple.

12. The glasses-type device according to claim 8, wherein the first temple includes the power supply and is a left temple, and the second temple includes the controller and is a right temple.

13. The glasses-type device according to claim 8, wherein at last one of the first ear hook and the second ear hook is deformable in shape.

14. A charger for charging the glasses-type device according to claim 8, comprising:
   a power-transmitting coil to wirelessly transmit electric power to a power-receiving coil of the power supply; and
   a guide structure having a shape that is fitted into a shape of the temple, when the glasses-type device is engaged with the charger.

* * * * *